US007082224B2

(12) United States Patent
Ikeda et al.

(10) Patent No.: US 7,082,224 B2
(45) Date of Patent: Jul. 25, 2006

(54) STATISTIC CALCULATING METHOD USING A TEMPLATE AND CORRESPONDING SUB-IMAGE TO DETERMINE SIMILARITY BASED ON SUM OF SQUARES THRESHOLDING

(75) Inventors: Mitsuji Ikeda, Hitachinaka (JP); Syoji Yoshida, Hitachi (JP); Keisuke Nakashima, Hitachi (JP); Koyo Katsura, Hitachioota (JP); Shigeru Shibukawa, Hitachinaka (JP); Haruo Yoda, Hinode-machi (JP); Takashi Hotta, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/060,400

(22) Filed: Feb. 18, 2005

(65) Prior Publication Data
US 2005/0147305 A1 Jul. 7, 2005

Related U.S. Application Data

(63) Continuation of application No. 09/802,958, filed on Mar. 12, 2001, now Pat. No. 6,898,318, which is a continuation of application No. 08/994,096, filed on Dec. 19, 1997, now Pat. No. 6,249,608.

(30) Foreign Application Priority Data
Dec. 25, 1996 (JP) ................................... 8-344955
Jan. 16, 1997 (JP) ....................................... 9-5399

(51) Int. Cl.
*G06K 9/64* (2006.01)
(52) U.S. Cl. ...................... 382/278; 382/209
(58) Field of Classification Search ................ 382/278, 382/270, 151, 205, 209, 216, 218, 276, 300; 708/5; 348/129
See application file for complete search history.

(56) References Cited

U.S. PATENT DOCUMENTS

| 4,183,013 | A | | 1/1980 | Agrawala et al. |
| 4,315,318 | A | | 2/1982 | Kato et al. |
| 4,541,116 | A | | 9/1985 | Lougheed |
| 4,635,292 | A | | 1/1987 | Mori et al. |
| 4,703,513 | A | | 10/1987 | Gennery |
| 4,745,562 | A | | 5/1988 | Prazdny et al. |
| 4,747,148 | A | | 5/1988 | Watanabe et al. |
| 4,864,629 | A | * | 9/1989 | Deering ...................... 382/216 |
| 5,073,963 | A | | 12/1991 | Sammons et al. |
| 5,091,963 | A | | 2/1992 | Litt et al. |
| 5,113,454 | A | | 5/1992 | Marcantonio et al. |
| 5,168,529 | A | | 12/1992 | Peregrim et al. |
| 5,168,530 | A | | 12/1992 | Peregrim et al. |
| 5,280,530 | A | | 1/1994 | Trew et al. |
| 5,390,262 | A | | 2/1995 | Pope |
| 5,412,738 | A | | 5/1995 | Brunelli et al. |
| 5,495,537 | A | | 2/1996 | Bedrosian et al. |
| 5,579,411 | A | | 11/1996 | Shou et al. |
| 5,623,560 | A | | 4/1997 | Nakajima et al. |
| 5,768,404 | A | | 6/1998 | Morimura et al. |
| 5,850,466 | A | | 12/1998 | Schott |
| 5,852,678 | A | | 12/1998 | Shiau et al. |

FOREIGN PATENT DOCUMENTS

| DE | 37 40 066 | 3/1989 |
| EP | 0 584 701 | 2/1994 |
| JP | 56-75139 | 6/1981 |
| JP | 7 51257 | 2/1995 |

OTHER PUBLICATIONS

J. Martin et al.: "Comparison of Correlation Techniques," Intelligent Autonomous Systems, IAS-4, Proceedings of the International Conference on Intelligent Anonymous Systems, Karlsruhe, Germany, Mar. 27-30, 1995, pp. 86-93, 1995, Amsterdam, Netherlands, IOS Press, Netherlands.

J. Schumann: "Anschaulicher Vergleich Verschiedener Dimensionierungsregeln fuer Linerare Zeichenerkennungssysteme" Wiss. Ber. Aeg-Telefunken, vol. 43, No. 3/4, 1970, pp. 209-214.

C. T. Dreher et al.: "A Potential Discrete Analog Processor for Pattern Recognition," Pattern Recognition, vol. 13, No. 3, 1981, pp. 207-218.

* cited by examiner

Primary Examiner—Yon J. Couso
(74) Attorney, Agent, or Firm—Kenyon & Kenyon LLP

(57) ABSTRACT

An apparatus for calculating a normalized correlation coefficient used as a similarity evaluation measure by using image data values of pixels in a template image and image data values of pixels in a subimage, included in a search image, corresponding to the template image, has a memory that stores image data values of pixels in the search image and calculating means that calculate a sum of image data values of pixels in the template image and a sum of image data values of pixels in the first rectangular region in the search image or a sum of squares of image data values of pixels in the template image and a sum of squares of image data values of pixels in the first rectangular region in the search image. Normalized correlation coefficient calculating means calculate a normalized correlation coefficient on the basis of the sum of image data values of pixels in the template image and the sum of image data values of pixels in the first rectangular region in the search image, or the sum of squares of image data values of pixels in the template image and the sum of squares of image data values of pixels in the first rectangular region in the search image.

14 Claims, 30 Drawing Sheets

TEMPLATE IMAGE

SEARCH IMAGE

| STARTING POINT | PIXEL-1 | PIXEL-2 | PIXEL-3 | PIXEL-4 | PIXEL-5 | PIXEL-6 | PIXEL-7 | PIXEL-8 | PIXEL-9 | F(i, j) |
|---|---|---|---|---|---|---|---|---|---|---|
| (0, 0) | 0 | 400 | 4000 | 4000 | 4100 | 5700 | | | | 5258 |
| (0, 1) | 900 | 3400 | 11500 | 11900 | 12800 | 17700 | 18100 | 18200 | 19100 | 18647 |
| (0, 2) | 3600 | 10000 | 13600 | 15200 | 18800 | 20400 | 20800 | 22400 | 26000 | 27120 |
| (1, 0) | 100 | 100 | 1000 | | | | | | | 894 |
| (1, 1) | 100 | 500 | 4100 | 4200 | 4200 | 5800 | | | | 5174 |
| (1, 2) | 900 | 3400 | 4300 | 4400 | 5300 | 10200 | | | | 9975 |
| (2, 0) | 0 | 100 | 100 | 100 | 200 | 200 | 1100 | | | 545 |
| (2, 1) | 0 | 100 | 1000 | 1000 | 1100 | 1200 | 2100 | | | 1335 |
| (2, 2) | 0 | 400 | 4000 | 4000 | 4000 | 4100 | 5000 | | | 4596 |

MEMORY MAP

| 0 | 1 | 2 | 3 | ... | | | | n-1 |
|---|---|---|---|---|---|---|---|---|
| 0 | n-1 | n-2 | n-3 | ... | | | | 2n-1 |
| 2n | ... | | | | | | | |
| 3n | ... | | | | | | | |
| ⋮ | | | | | | | | |
| | | | | | | | | |
| | | | | | | | | |
| mn | | | | | | | | mn-1 |

| 211 | 212 | 213 | 214 | 215 | 216 | 217 | 218 | 219 |
|---|---|---|---|---|---|---|---|---|
| 221 | 222 | 223 | 224 | 225 | 226 | 227 | 228 | 229 |
| 231 | 232 | 233 | 234 | 235 | 236 | 237 | 238 | 239 |
| 241 | 242 | 243 | 244 | 245 | 246 | 247 | 248 | 249 |
| 251 | 252 | 253 | 254 | 255 | 256 | 257 | 258 | 259 |
| 261 | 262 | 263 | 264 | 265 | 266 | 267 | 268 | 269 |
| 271 | 272 | 273 | 274 | 275 | 276 | 277 | 278 | 279 |
| 281 | 282 | 283 | 284 | 285 | 286 | 287 | 288 | 289 |

FIG.20B

| 211' | 212' | 213' | 214' | 215' | 216' | 217' | 218' | 219' |
|---|---|---|---|---|---|---|---|---|
| 221' | 222' | 223' | 224' | 225' | 226' | 227' | 228' | 229' |
| 231' | 232' | 233' | 234' | 235' | 236' | 237' | 238' | 239' |
| 241' | 242' | 243' | 244' | 245' | 246' | 247' | 248' | 249' |
| 251' | 252' | 253' | 254' | 255' | 256' | 257' | 258' | 259' |
| 261' | 262' | 263' | 264' | 265' | 266' | 267' | 268' | 269' |
| 271' | 272' | 273' | 274' | 275' | 276' | 277' | 278' | 279' |
| 281' | 282' | 283' | 284' | 285' | 286' | 287' | 288' | 289' |

| 211 | 212 | 213 | 214 | 215 | 216 | 217 | 218 | 219 |
|---|---|---|---|---|---|---|---|---|
| 221 | 222 | 223 | 224 | 225 | 226 | 227 | 228 | 229 |
| 231 | 232 | 233 | 234 | 235 | 236 | 237 | 238 | 239 |
| 241 | 242 | 243 | 244 | 245 | 246 | 247 | 248 | 249 |
| 251 | 252 | 253 | 254 | 255 | 256 | 257 | 258 | 259 |
| 261 | 262 | 263 | 264 | 265 | 266 | 267 | 268 | 269 |
| 271 | 272 | 273 | 274 | 275 | 276 | 277 | 278 | 279 |
| 281 | 282 | 283 | 284 | 285 | 286 | 287 | 288 | 289 |

FIG.35B

| 211' | 212' | 213' | 214' | 215' | 216' | 217' | 218' | 219' |
|---|---|---|---|---|---|---|---|---|
| 221' | 222' | 223' | 224' | 225' | 226' | 227' | 228' | 229' |
| 231' | 232' | 233' | 234' | 235' | 236' | 237' | 238' | 239' |
| 241' | 242' | 243' | 244' | 245' | 246' | 247' | 248' | 249' |
| 251' | 252' | 253' | 254' | 255' | 256' | 257' | 258' | 259' |
| 261' | 262' | 263' | 264' | 265' | 266' | 267' | 268' | 269' |
| 271' | 272' | 273' | 274' | 275' | 276' | 277' | 278' | 279' |
| 281' | 282' | 283' | 284' | 285' | 286' | 287' | 288' | 289' |

STATISTIC CALCULATING METHOD USING A TEMPLATE AND CORRESPONDING SUB-IMAGE TO DETERMINE SIMILARITY BASED ON SUM OF SQUARES THRESHOLDING

CROSS REFERENCES TO RELATED CASES

This is a continuation of application Ser. No. 09/802,958 filed 12 Mar. 2001, now U.S. Pat. No. 6,898,318, which is a continuation of application Ser. No. 08/994,096 filed 19 Dec. 1997, now U.S. Pat. No. 6,249,608.

BACK GROUND OF THE INVENTION

The present invention relates to a field of a computer application apparatus, especially an image processor and an image processing apparatus using it.

Furthermore, more in detail, the present invention is related with template matching to extract a region resembling a template image from an object image, and with moving-average filtering for an image data of each pixel, which are executed by using pixels in a rectangular filtering region including the pixel, in an object image, the size of the rectangular region being preset.

The present invention relates to a pattern recognition method and an apparatus using the method which are used for positioning elements in a semiconductor apparatus, searching parts in a FA line, a remote sensing, and so forth.

In various fields using an image processing, a template matching method is used to search a partial area in an image (referred to as a search image) obtained by a sensor, which resembles a specified image pattern (referred to as a template). Such a template matching method is disclosed, for example, in "Image Analysis Handbook", by Mikio Takagi and Akihisa Shimoda, University of Tokyo Press (1991). In a template matching method, it is often performed that each pixel is represented by a n-bit data for expressing a multi-level gradation image data, and a normalized correlation coefficient is used as a measure for a similarity of patterns. A normalized correlation coefficient $r(i, j)$ is expressed by the following equation in which $t(m, n)$ ($m=0, 1, \ldots, M-1$; $n=0, 1, \ldots, N-1$) is a data value of a pixel in a template, $s(i+m, j+n)$ ($m=0, 1, \ldots, M-1$; $n=0, 1, \ldots, N-1$); and $(I, j)$ is a starting point of a sub-image in a search image, of which a similarity to the template is to be evaluated, and P is the number of pixels in the template.

$$r(i, j) = \frac{\sum_{n=0}^{N-1}\sum_{m=0}^{M-1}(s(i+m, j+n) \cdot t(i, j)) - \frac{1}{P}\left(\sum_{n=0}^{N-1}\sum_{m=0}^{M-1}(s(i+m, j+n))\right) \cdot \left(\sum_{n=0}^{N-1}\sum_{m=0}^{M-1}t(i, j)\right)}{\sqrt{\sum_{n=0}^{N-1}\sum_{m=0}^{M-1}(s(i+m, j+n))^2 - \frac{1}{P}\left(\sum_{n=0}^{N-1}\sum_{m=0}^{M-1}s(i+m, j+n)\right)^2} \cdot \sqrt{\sum_{n=0}^{N-1}\sum_{m=0}^{M-1}(t(i, j))^2 - \frac{1}{P}\left(\sum_{n=0}^{N-1}\sum_{m=0}^{M-1}t(i, j)\right)^2}} \quad (2)$$

In performing template matching, the above-described normalized correlation coefficient is obtained for each of a plurality of sub-images, and one or plural sub-images which are determined to resemble a template are selected in accordance with the obtained normalized correlation coefficients. A method using a normalized correlation coefficient can perform template matching without receiving effects of variations between image data values of pixels in a template image and those of pixels in a search image, the variation being caused, for example, by changes in lighting.

Since calculation steps or data amount to be calculated are very huge in a pattern matching method using the above-mentioned normalized correlation coefficient, a method for efficiently obtaining a normalized correlation coefficient has been investigated.

In one of existing methods for performing a template matching method at a high speed, absolute values of differences between image data values of pixels in a template image and those of pixels in a sub-image to be processed, of a search image, are accumulated while a normalized correlation coefficient is obtained for the sub-image, and the process for calculating the normalized correlation coefficient is closed, if a sum of the accumulated absolute values exceeds a preset threshold value.

In the above-mentioned existing measure, since the accumulated sum of absolute values of differences between image data values of pixels in a template image and those of pixels in a sub-image to be processed is used to close a process for obtaining a normalized correlation coefficient, there exists a problem in which if variations of image data values of pixels in a template image and those of pixels in a sub-image of a search image are caused, for example, by changes in lighting, a process for obtaining a normalized correlation coefficient is wrongly closed for even a sub-image which has a high similarity to the template image because of the large accumulated sum of absolute value of the differences. In the following, this problem will be explained in detail with reference to FIG. 13 and FIG. 14.

FIG. 13 is an example of a template image, and FIG. 14 is an example of a search image for which a sub-image resembling the template image is searched. In these figures, squares shows pixels, and values shown in the squares indicate levels in gradation of images. The similarity between two images is to be determined, not based on the nearness between absolute image data values of pixels in the two images, but on the nearness between relative local changing tendencies in image data values of pixels in the two images. Therefore, a sub-image, in the search image shown in FIG. 14, most resembling the template image shown in FIG. 13, is a sub-image shown at the right-upper part in FIG. 14, which are composed of pixels 1403, 1404, 1405, 1408, 1409, 1410, 1413, 1414 and 1415. In fact, a normalized correlation coefficient between the template image and the sub-image is 1.0. However, the value in a accumulated sum of absolute values of difference between image data values, which is used to close a process for obtaining a normalized correlation coefficient in the existing methods, is 360 for the sub-image at the right-upper part, and is much larger than 80 for a sub-image at the left-lower part, which is composed of pixels 1411, 1412, 1413, 1416, 1417, 1418, 1421, 1422 and 1423. Therefore, if a threshold value of the accumulated sum, which is set to close a process for obtaining a normalized correlation coefficient, is preset to a value in a range 80 to 460, the sub-image at the left-lower part is searched, but searching the sub-image at the right-upper part is closed in the midst. Hereupon, the sub-image at the left-lower part is an image of a laterally striped pattern.

Furthermore, in many cases including the above example, it is difficult to set an adequate threshold value for the above-mentioned accumulated sum.

Furthermore, an image processing technique is indispensable to fields using a microscope, medical equipment, etc., and also to a remote sensing technique, an inspection technique of a product, etc. In image processing, a filtering method to remove noise components, or to improve the quality of a processed image takes an important role, and various algorithms for implementing filtering methods have been devised, and some of them have been incorporated into hardware systems.

A moving-average filtering method used as one of filtering methods performs filtering for an image data of each object pixel in an image to be processed, by averaging image data values of pixels in a rectangular region including the object pixel, the size of the rectangular (kernel size) being usually preset. In the following, outline of a moving-average filtering method will be explained with reference to FIGS. 35A and 35B. Hereupon, FIG. 35A is an image composed of 9 pixels in the column direction (the lateral direction)×8 pixels in the row direction. Numerals 211–289 indicate pixels. FIG. 35B shows an image obtained by executing moving-average filtering with a kernel size of 5 pixels×5 pixels, for image data of pixels shown in FIG. 35A. Numerals 211'–289' indicated pixels of which image data values were filtered. For example, an image data value of a pixel 233' is an average value of image data values of pixels in a region for 5 pixels in the row direction and 5 pixels in the column direction, in which the pixel 233 is centered, that is, an average value of image data values of pixels 211, 212, 213, 214, 215, 221, 222, 223, 224, 225, 231, 232, 233, 234, 235, 241, 242, 243, 244, 245, 251, 252, 253, 254 and 255. Similarly, an image data value of a pixel 234' is an average value of image data values of pixels in a region for 5 pixels×5 pixels, in which the pixel 234 is centered, further an image data value of a pixel 235' is an average value of image data values of pixels in a region for 5 pixels×5 pixels, in which the pixel 235 is centered, and so on. Thus, an image data value of each pixel in the image shown in FIG. 35B has an average value of image data values of pixels in a region having the kernel size for 5 pixels×5 pixels, in which the corresponding pixel in the image shown in FIG. 35A is centered.

An efficient average-moving filtering method has been devised in Japanese Patent Laid-Open 51257/1995. FIG. 36 shows a schematic block diagram of a system for implementing the devised average-moving filtering method of JP-A-51257/1995. The system shown in FIG. 36 is composed of an image input device 3601 for inputting an image, an image memory 3604 for storing image data of an input image, a calculation circuit 3602 for calculating an average value of image data values of n pixels in the row direction, a memory 3603 for storing calculated average values for pixels in the row direction, and a calculation circuit 3605 for obtaining a moving-average value by using the average values stored in the memory 3603.

Image data of an image input by the image input device 3601 are stored in the image memory 3604, and the calculation circuit 3602 obtains an average value of image data of n pixels in the row direction, in parallel to storing of the image data. In the following, procedures to obtain a moving-average value by using data stored in the memory 3603 will be explained with reference to FIG. 37. In FIG. 37, numeral 2101 indicates a region for 5 pixels×5 pixels, which is to be presently processed for obtaining an moving-average value, and numeral 2102 indicates a region (referred to as kernel region) for 5 pixels×5 pixels, which was previously processed to obtain an moving-average value. Moreover, numerals 2103 and 2104 indicate two areas, each of the areas being composed of n (=5) pixels in the row direction, respectively. A position of a pixel centered in an kernel region changes from the most left position to the most right position in the top row, in the image shown in FIG. 37, and the position of a center pixel similarly changes in the successive rows, and so forth. An moving-average value for the region 2101 is obtained based on the following relation: a moving-average value for the region 2101=a moving-average value for the region 2102−(an average value for the area 2103−an average value for the area 2104)/(the number of lines in the region 2101).

The average values for the areas 2103 and 2104 shown in FIG. 37 are stored in the memory 3603 shown in FIG. 36, and since the moving-average value for the region 2102 was obtained in the previous calculation step, the value is held in the calculation circuit 3605. Therefore, the moving-average value for the region 2101 can be obtained by reading the average values for the areas 2103 and 2104 out of the memory 3603 and using them.

In the above-mentioned conventional technique, when average values for every five pixels in the row direction are written in the memory 3603, access of the memory 3603 can be performed by designating successive addresses in the column direction. However, when the average values for the areas 2103 and 2104 are read out of the memory 3603 to obtain the moving-average value for the area 2101, it is necessary to perform access to the memory 3603 by designating discontinuous addresses.

Generally, a high frequency cycle mode, for example, a high speed page mode, is provided for a memory such as a DRAM, a synchronous DRAM, etc., and it is possible to perform access to such a memory for successive addresses at a high speed.

Therefore, if a DRAM or a synchronous DRAM is used for the memory 3603, although since it is possible to perform access to the memory 3603 by designating successive addresses in the row direction, high-speed access to the memory 3603 can be performed during a data write-in mode, high-speed access to the memory 3603 is difficult during a data read-out mode, since access to the memory 3203 is performed by designating discontinue addresses.

SUMMARY OF THE INVENTION

The first object of the present invention is to provide an image processing apparatus using a template matching method wherein it is possible to prevent an erroneous close of pattern matching, and easily to set an adequate threshold value for closing of pattern matching.

The above object can be attained by a template matching method comprising the steps of obtaining a threshold value for closing evaluation of a similarity between a template image and a sub-image to be processed in a search image, which has the same size as that of the template image, repeating to obtain a square of a difference between an image data value of each pixel in the sub-image and that of a corresponding pixel in the template image and to add the square to a sum, in order, and closing the evaluation of the similarity if the sum exceeds the threshold value.

The second object of the present invention is to provide an image processor, an image processing apparatus, and a image processing method, which can performs moving-average values for image data for an image including a large number of pixels at a high speed.

To attain the second object, the present invention provides an image processor for reading image data of pixels in an image to be processed, from an external image, and obtaining an average value of image data values of pixels in each rectangular area expressed with a plurality of rows and a plurality of columns, in turn in the row direction, the image processor comprising a memory means for storing image data of pixels in at least one line in the row direction of the image, a control means for controlling access to the memory means so that an image data of each pixel is read from or written in the memory means in turn in the row direction, and access to the external memory so that an image data of each pixel is read from the external memory in turn in the row direction, and a calculation means for obtaining an average value of image data values of pixels in a rectangular area to be presently processed, by using an average value for a rectangular area which was previously processed and image data read from the memory means and the external memory. In accordance with the present invention, since access to the memory means is controlled so that an image data of each pixel is read from the memory means in turn, or an image data of each pixel is written in the memory means in turn, in the row direction, and access to the external memory is also controlled so that an image data of each pixel is read from the memory means in turn in the row direction, it is possible to perform access to the memory means and the external memory with a high frequency cycle mode. As the memory means and the external memory, a line memory or an image memory can be used. Furthermore, a DRAM and a synchronous DRAM are applicable to compose the memory means and the external memory.

BRIEF DESCRIPTION OF THE DRAWINGS

FIG. 20A and FIG. 20B are diagrams for conceptually explaining an image to be processed and a processed image, by means of the moving-average filter according to the present invention, respectively.

FIG. 35A and FIG. 35B are diagrams conceptually explaining an image to be processed and a processed image, by means of a conventional moving-average filter, respectively.

DETAILED DESCRIPTION OF THE PREFERRED EMBODIMENTS

Figure 1:
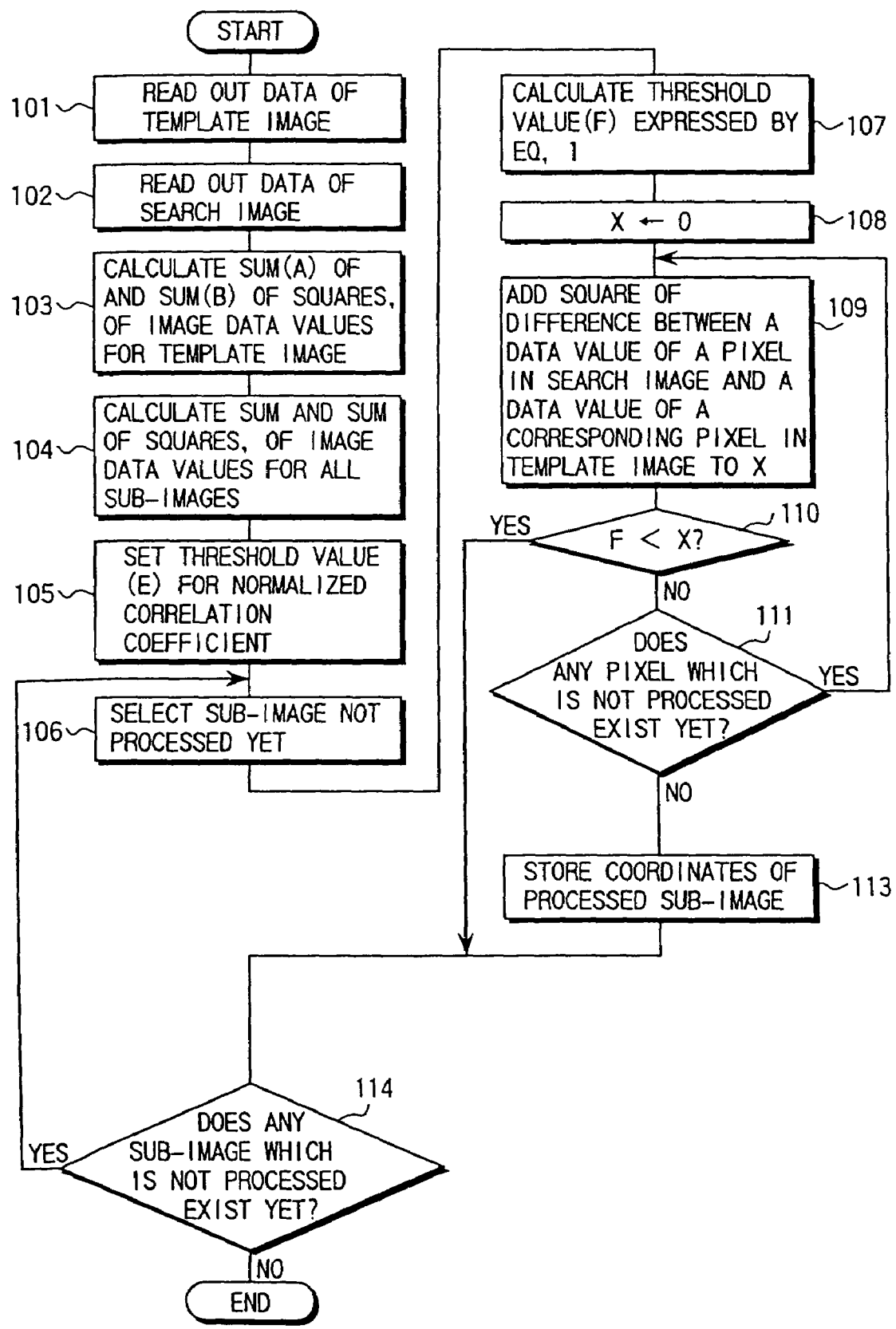
FIG. 1 is a flow chart showing a template matching method of an embodiment according to the present invention.
Figure 13:
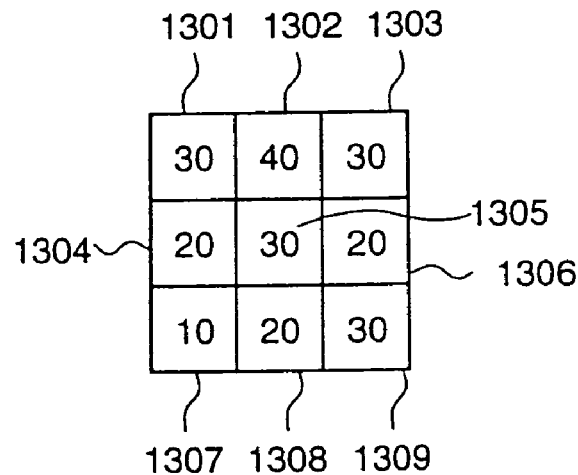
FIG. 13 is an example of a template image.
Figure 14:
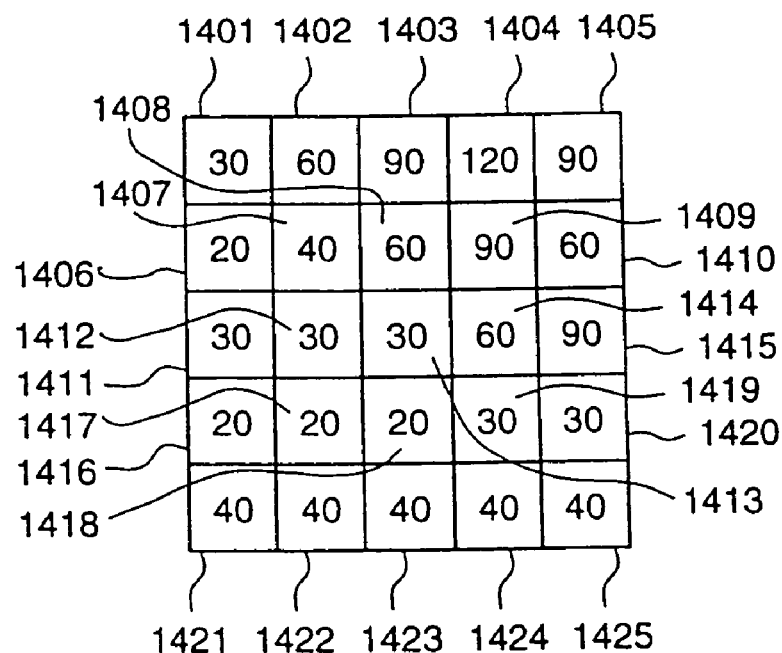
FIG. 14 is an example of a search image.

Various embodiments according to the present invention will be explained referring to the drawings. FIG. 1 is a flow chart of processing for a template matching method in accordance with the present invention. In the following, a template matching process, which is carried out, for example, by a general purpose computer, for a template image shown in FIG. 13 and a sub-image of a search image shown in FIG. 14 will be explained. The template image and the search image are input, for example, by an image scanner, and image data of the two images stored in an external memory.

At first, the image data are read out of the external memory, and the data of the template and search images are stored with an array type of t(m, n)(m=0, 1, 2; n=0, 1, 2) and s(i, j)(i=0, 1, . . . , 4; j=0, 1, . . . 4), respectively, in an internal memory of the computer (steps 101 and 102).

Next, a sum, and a sum of squares, of image data values of pixels in the template image (step 103). The sum A, and the sum B of squares, of the image data values, are 230 and 6500, respectively. On the other hand, as to the search image, a sum, and a sum of squares, of image data values are calculated for each of all partial areas in the search image, which has the same size as that of the template image (hereafter, a partial area is referred to as a sub-image) (step 104).

Figure 2:
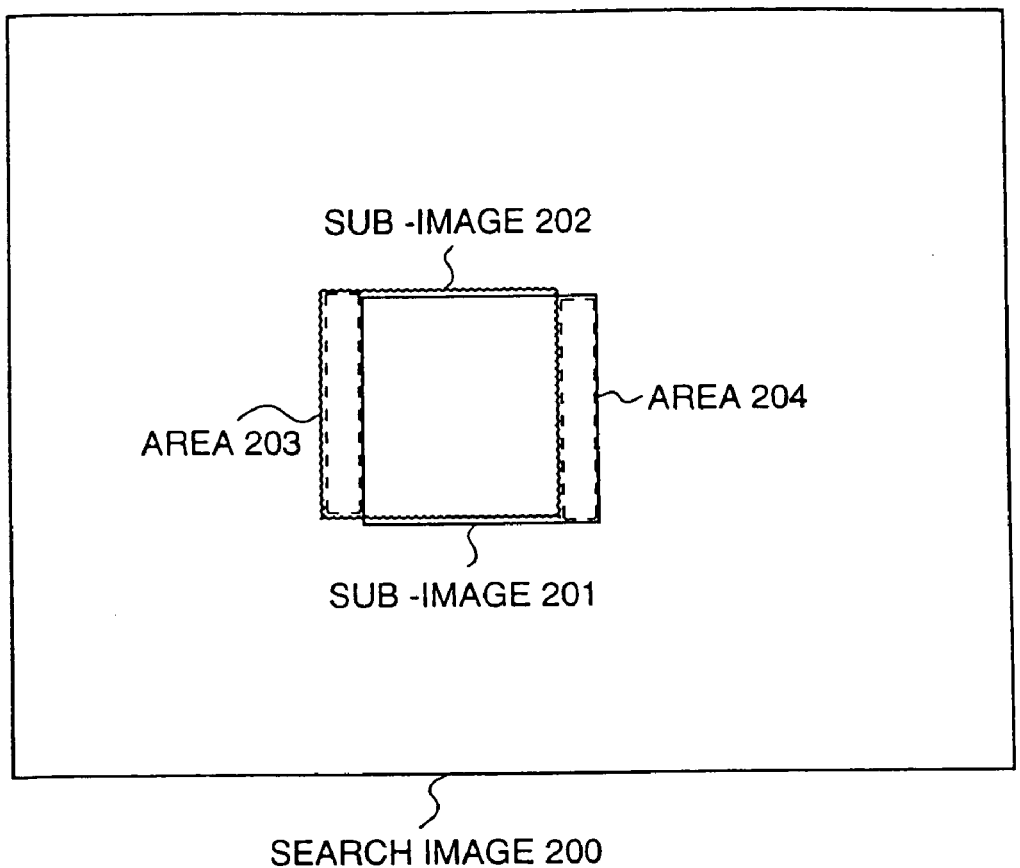
FIG. 2 is an illustration for conceptually explaining a method of obtaining a sum, and a sum of squares, of image data values of pixels in a sub-image, according to the present invention.
Figure 3:
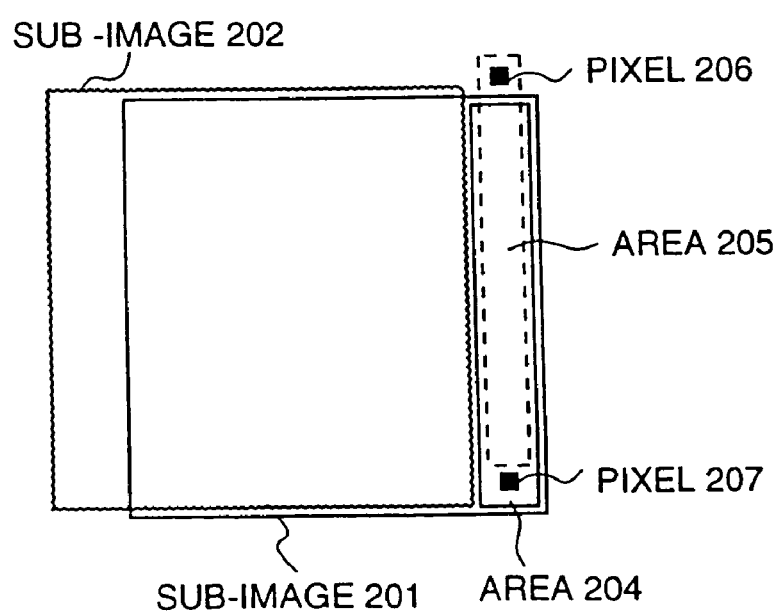
FIG. 3 is an illustration for conceptually explaining a method of obtaining a sum, and a sum of squares, of image data values of pixels in a sub-image, according to the present invention.

A method of efficiently obtaining a sum, and a sum of squares, of image data values for the template image and the search image will be explained with reference to FIG. 2–FIG. 6. A concept of improvement for obtaining the above-mentioned sums are shown in FIG. 2 and FIG. 3. In FIG. 2, a sum G' of image data values for a present sub-image 201 having the same size as that of the template image is equal to a value obtained by subtracting a sum U of image data values for an area 203 from a sum G of image data values for a previous sub-image 202 which is located at an area shifted from the present sub-image 201 in the reverse main scanning direction by one pixel, and by adding a sum V of image data values for an area 204 to the subtraction result. That is, G'=G−U+V. Furthermore, as shown in FIG. 3, a sum V of image data values for the area 204 is equal to a value obtained by subtracting a image data value y of a pixel 206 from a sum W of image data values for an area 205 which is located at an area shifted from the area 204 in the upper direction by one line, and by adding a image data value z of a pixel 207 to the subtraction result, that is, V=W−y+z. Therefore, it is possible to obtain the sum G' of image data values for the sub-image 201 by executing fundamentally four times of addition and subtraction, if the sum G of image data values for the sub-image 202 and the sum U of image data values for the area 203 are calculated in advance.

Figure 4:
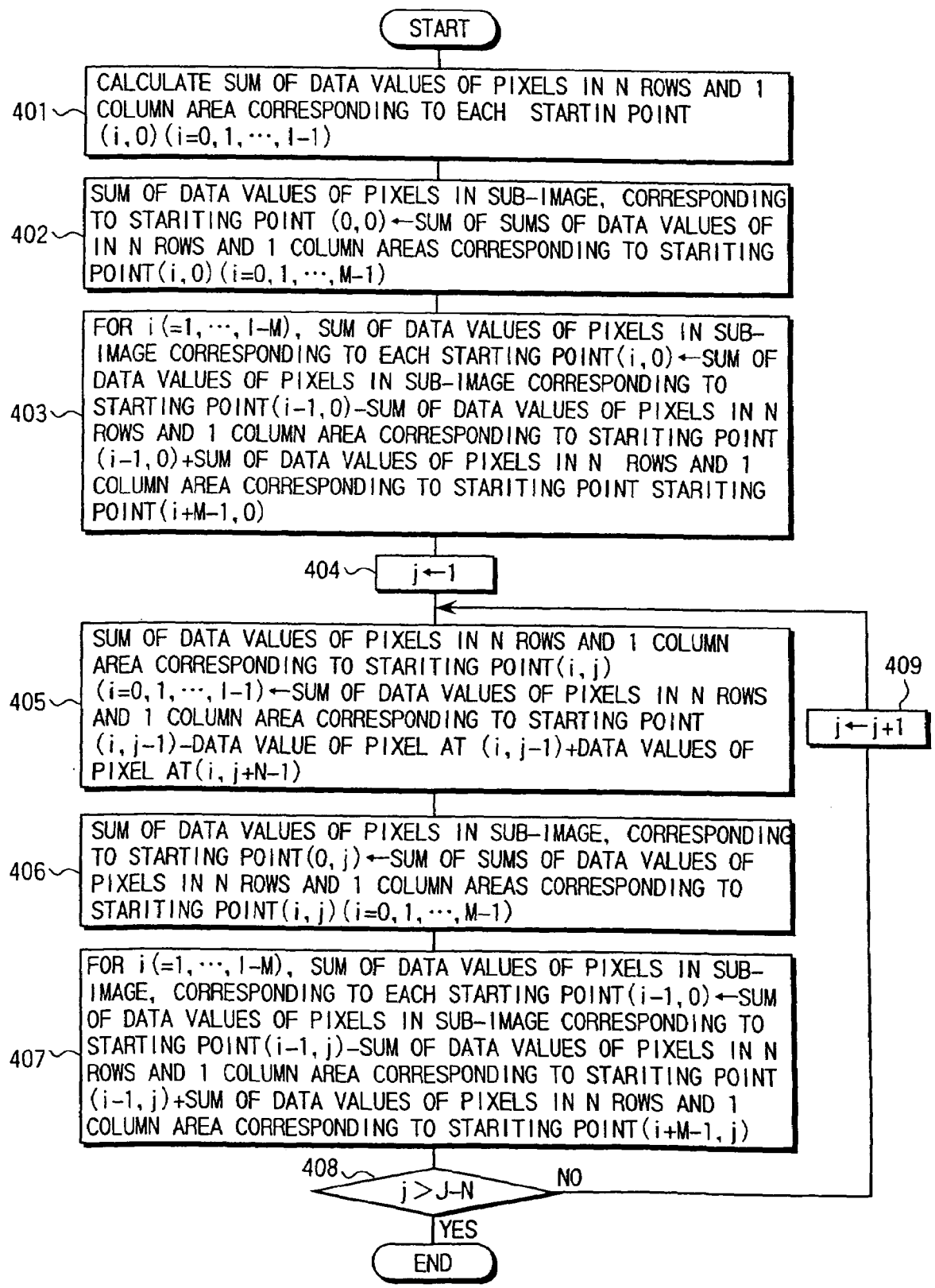
FIG. 4 is a flow chart of procedures implementing the method shown in FIG. 2 and FIG. 3.

FIG. 4 is a flow chart of obtaining a sum of image data values for all sub-images in the search image, the size of each sub-area being the same as that of the template image, and realizing the concept shown in FIG. 2 and FIG. 3.

At first, in order to obtain sums of image data values for (I−M+1) sub-images corresponding to the respective starting points (i, 0)(i=0, 1, . . . , I−M, where I is the number of pixels in the search image in the row direction, and M is the number of pixels in the template image in the row direction), a sum of image data values for each area composed of pixels for 1 column and N rows is calculated (step 401), the number N being equal to that of rows in the template image, further each area corresponding to a starting point (i, 0)(I=0, 1, . . . , I−1). At first, by accumulating M sums of image data values for M areas of pixels for 1 column and N rows, a sum of image data values for a sub-image corresponding to a starting point (0, 0) is obtained (step 402). Successively, sums of sub-images corresponding to starting points (1, 0), (2, 0), . . . , (I−M, 0) are obtained in turn, by adding a sum of image data values for an area of pixels for 1 column and N rows to a sum for a previous sub-area and subtracting a sum of image data values for another area of pixels for 1 column and N rows from the sum for the previous sub-area, that is, adding a differential amount between the above two sums to the sum for the previous sub-image (step 403).

Furthermore, in order to obtain sums of image data values for (I−M+1) sub-images corresponding to the respective starting points (i, 1)(i=0, 1, . . . , I−M, where I is the number of pixels in the search image in the row direction, and M is the number of pixels in the template image in the row direction), a sum of image data values for each area of pixels for 1 column and N rows is calculated (step 405), the number N being equal to that of rows in the template image, further each area corresponding to a starting point (i, 1)(I=0, 1, . . . , I−1). Each sum of image data values for each area of pixels for 1 column and N rows is obtained by making use of the already obtained sums of image data values for areas corresponding to starting points (i, 0)(I=0, 1, . . . , I−1), and adding an image data value of a pixels to a sum for a previous area and subtracting an image data value of another pixel from the previous area, that is, adding a differential amount between the above two image data values to the sum for the previous area. By accumulating the above-obtained M sums of image data values for M areas, each area being composed of pixels for 1 column and N rows, a sum of image data values for a sub-image corresponding to a starting point (0, 1) is obtained (step 406). Successively, sums of sub-images corresponding to starting points (1, 1), (2, 1), . . . , (I−M, 1) are obtained in turn, by adding a sum of image data values for an area of pixels for 1 column and N rows to a sum for a previous sub-area and subtracting a sum of image data values for another area of pixels for 1 column and N rows from the sum for the previous sub-area, that is, adding a differential amount between the above two sums to the sum for the previous sub-image (step 407).

For J=2, . . . , J−N, a sum of image data values for each sub-image is also obtained by making use of previously calculated results (step 405–step 409), similarly for J=1. Representing a sum of image data values for each sub-image corresponding to a starting point (i, j) by C(i, j) in the search image shown FIG. 14, C(i,j)(i=0, 1, 2; J=0, 1, 2) are as follows.

$$(C(0, 0), C(0, 1), C(0, 2), C(1, 0), C(1, 1), C(1, 2), C(2, 0), C(2, 1), C(2,2))=(390, 580, 690, 270, 380, 470, 270, 310, 380)$$

In a process for obtaining a sum of squares of image data values for all sub-images in the search image, squares of image data values of pixels in the respective template and search images are obtained, and a sum of squares of image data values for each sub-image is further obtained by a process similar to the above-mentioned process for obtaining sums of image data values for all sub-images. Representing a sum of image data values for each sub-image corresponding to a starting point (i, j) by D(i, j) in the search image shown FIG. 14, D(i, j)(i=0, 1, 2; J=0, 1, 2) are as follows.

(D(0, 0), D(0, 1), D(0, 2), D(1, 0), D(1, 1), D(1, 2),
D(2, 0), D(2, 1), D(2, 2))=(20900, 44800,
58500, 9500, 20400, 30100, 8700, 1190, 19600)

Figure 5:
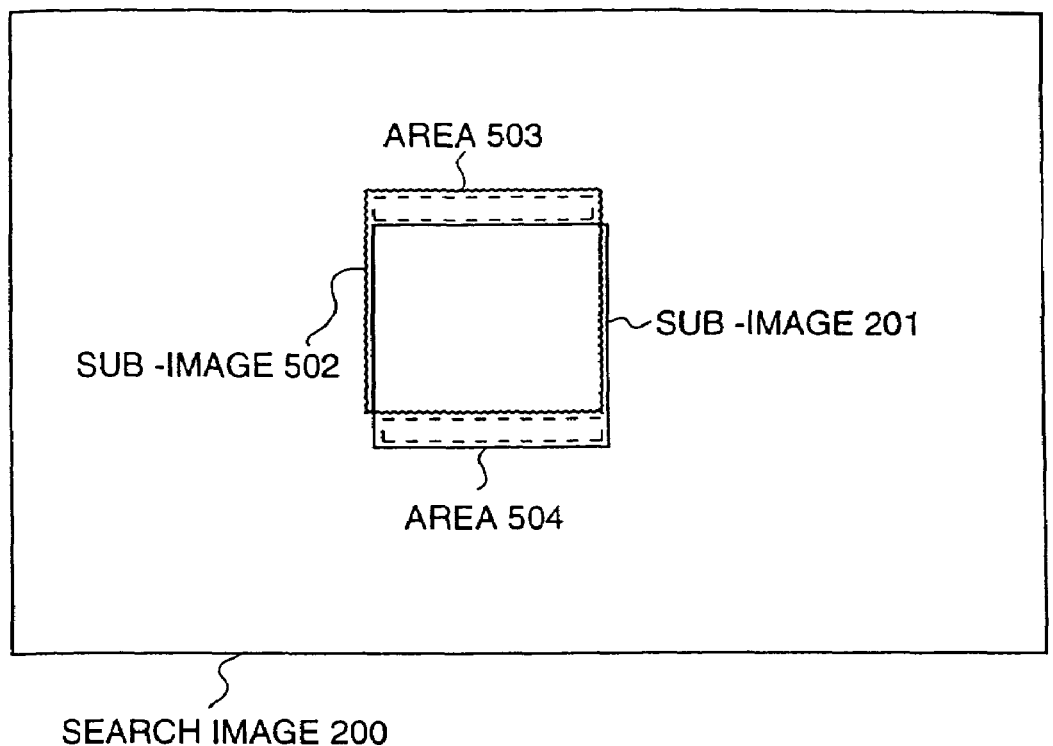
FIG. 5 is an illustration for conceptually explaining another method of obtaining a sum, and a sum of squares, of image data values of pixels in a sub-image, according to the present invention.
Figure 6:
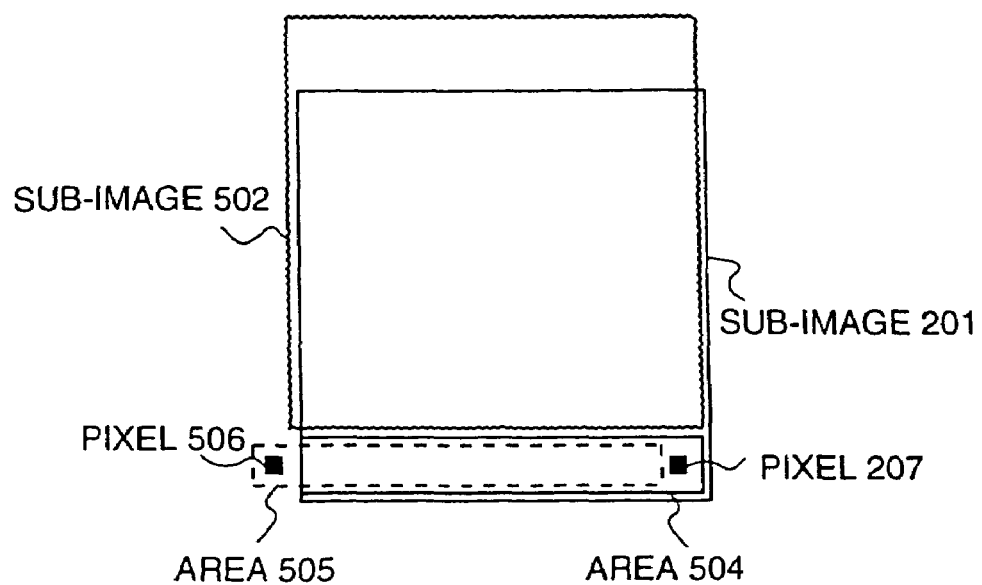
FIG. 6 is an illustration for conceptually explaining another method of obtaining a sum, and a sum of squares, of image data values of pixels in a sub-image, according to the present invention.

FIG. 5 and FIG. 6 show another method of efficiently obtaining a sum, and a sum of squares, of image data values. The method shown in FIG. 2 and FIG. 3 obtains a sum G' of image data values for the present sub-image 201, based on a difference between a sum of image data values for the sub-image 201 and a sum of image data values for the previous sub-image 202 shifted from the sub-image 201 in the reverse main scanning direction by one pixel. On the other hand, the method shown in FIG. 5 and FIG. 6 obtains a sum of image data values for a present sub-image 501, based on a difference between a sum of image data values for the sub-image 501 and a sum of image data values for a previous sub-image 502 shifted from the sub-image 501 in the upper row direction by one line.

Explanation returns to the flow chart shown in FIG. 1. At step 105, a threshold value E for closing evaluation for a similarity of a processed sub-image is set. The set threshold value E is determined corresponding to a normalized correlation coefficient. A normalized correlation coefficient takes a value in a range −1 to 1, and the values of −1 and 1 indicate that a processed sub-image does not resemble the template image at all, and that a processed sub-image completely agrees with the template image, respectively. Since any value in the range −1 to 1 can be set as the threshold value, even a user of little experience can intuitively set the threshold value E. Moreover, it is possible to set the threshold value before the start of the processing shown in FIG. 1. In this embodiment, it is assumed that the threshold value E is set to 0.7.

The above explanation is as to a pre-processing, and in the pre-processing according to the present invention, it is possible to obtain a sum, and a sum of squares, of image data values for each of the template image and the search image by using image data which are obtained by scanning the respective template and search images at one time. Next, a process for obtaining a normalized correlation coefficient is executed for a sub-image to be processed. In the process, at first, a sub-image corresponding to a starting point (0, 0) is selected (step 106), and a threshold value F (0, 0) for closing a process for evaluating a similarity of the sub-image is obtained, based on the following equation 3 (step 107).

$$F(i, j) = B + D(i, j) - \frac{2AC(i, j)}{P} - 2E \cdot \sqrt{B - \frac{A^2}{P}} \cdot \sqrt{D(i, j) - \frac{(C(i, j))^2}{P}} \quad (3)$$

, where A: a sum of image data values for the template image,
B: a sum of squares of image data values for the template image,
C: (i, j): a sum of image data values for a sub-image corresponding to a starting point (i, j),
D: (i, j): a sum of squares of image data values for a sub-image corresponding to a starting point (i, j),
E: the set threshold value for a normalized correlation coefficient,
F: (i, j): a threshold value for closing evaluation for a similarity of a sub-image corresponding to a starting point (i, j), and
P: the number of pixels in the template image.

Hereupon, as to a sub-image corresponding to a starting point (0, 0), a sum A of image data values for the template image is 230, a sum B of squares of image data values for the template image is 6500, a sum C(0, 0) of image data values for the sub-image is 390, a sum D(0, 0) of squares image data values for the sub-image is 20900, the threshold value E for a normalized correlation coefficient is 0.7, and the number of pixels in the template image is 9. Thus, the threshold value F(0, 0) is 5258. The threshold value F(0, 0) is the upper limit to a sum of squares of differences between image data values of pixels in the sub-image and those of the respective corresponding pixels in the template image, such that the sub-image has a normalized correlation coefficient of more than 0.7 to the template image. That is, if a sum of squares of differences between image data values of pixels in the sub-image and those of the respective corresponding pixels in the template image is larger than the threshold value F(0, 0), the normalized correlation coefficient between the sub-image and the template image is less than 0.7. This relation can be proved from equation 2, equation 3, and under the following conditions: the sum of squares of differences between image data values of pixels in the sub-image and those of the respective corresponding pixels in the template image >F(0, 0).

Figures 15, 17:
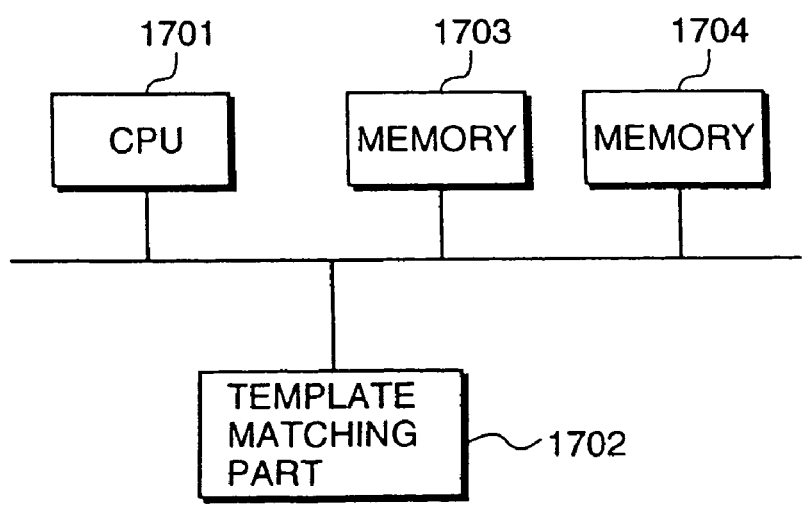
FIG. 15 shows results in examination processing for continuing template matching of each sub-image and a threshold value for closing the template matching.
FIG. 17 is a block diagram of a template matching apparatus of an embodiment according to the present invention.

Next, a square of a difference between an image data value of each pixel in the template image and that of a corresponding pixel in the sub-image is obtained in order, further a cumulative addition is performed for each obtained square, and it is determined whether the result of the cumulative addition exceeds the threshold value F(0, 0) (step 108–step 111). Since the result of the cumulative addition monotonously increases, if the result of the cumulative addition exceeds the threshold value F(0, 0), results in successive cumulative addition processes can not decrease from the threshold value F(0, 0). Therefore, when the result of the cumulative addition exceeds the threshold value F(0, 0), the process for estimating a similarity of the sub-image to the template image is closed, and a process for estimating a similarity of a next sub-image is started. When calculation for a sum of squares of differences between image data values of all pixels in the sub-image and those of all pixels in the template image is completed, if the sum does not exceed the threshold value F(0, 0), a normalized correlation coefficient between the sub-image and the template image is more than 0.7, and the starting point (0, 0) of the sub-image is registered. FIG. 15 shows a threshold value F(i, j) for a sub-image corresponding to a starting point (i, j), and results of the cumulative addition of squares of differences between image data values of pixels in the sub-image and those of pixels in the template image. For example, as to the sub-image corresponding to a starting point (0, 0), since an image data value of the first pixel of the sub-image is 30, and that of the corresponding first pixel of the template image is also 30, a sum of a square of a difference between an image data value of the pixel of the sub-image and that of the pixel of the template image is 0, and the sum does not exceed the threshold value F(0, 0). Therefore, successively cumulative addition for squares of the differences is continued. As for the sixth pixels in both images, since the result of cumulative addition is 5700, and it exceeds the threshold value F(0, 0) (=5258), cumulative addition for pixels from the seventh pixels are not performed, and processing of the next sub-image is started.

In results shown in FIG. 15, as to sub-images corresponding to start points (0, 1), (1, 0), (1, 1), (1, 2), (2, 0), (2, 1) and (2, 2), results of cumulative addition exceed the threshold values F at the ninth, third, sixth, sixth, seventh, seventh and seventh pixels, respectively. On the other hand, the result of cumulative addition for all pixels in a sub-image corresponding to a starting point (0, 2) does not exceed its threshold value F. The coordinate (0, 2) which is the starting point of the above sub-image is registered.

As mentioned above, by setting a threshold value E for a normalized correlation coefficient, it is possible, automatically to extract a sub-image which has a correlation coefficient more than E with the template image. Furthermore, template matching can be performed at a high-speed, since the cumulative addition is not always carried out for all pixels in a sub-image.

Furthermore, since coordinates of starting points for sub-images which are determined to match the template image are registered, it is possible to indicate a region matching the template by enclosing the region with a conspicuous line in the search image displayed on a CRT connected to, for example, a general purpose computer, to an operator. Hereupon, if a plurality of sub-images are determined to match the template image, in order to select a sub-image most matching to the template image, normalized correlation coefficients of the pertinent sub-images are calculated, and a sub-image having the largest normalized correlation coefficient is selected.

Figure 7:
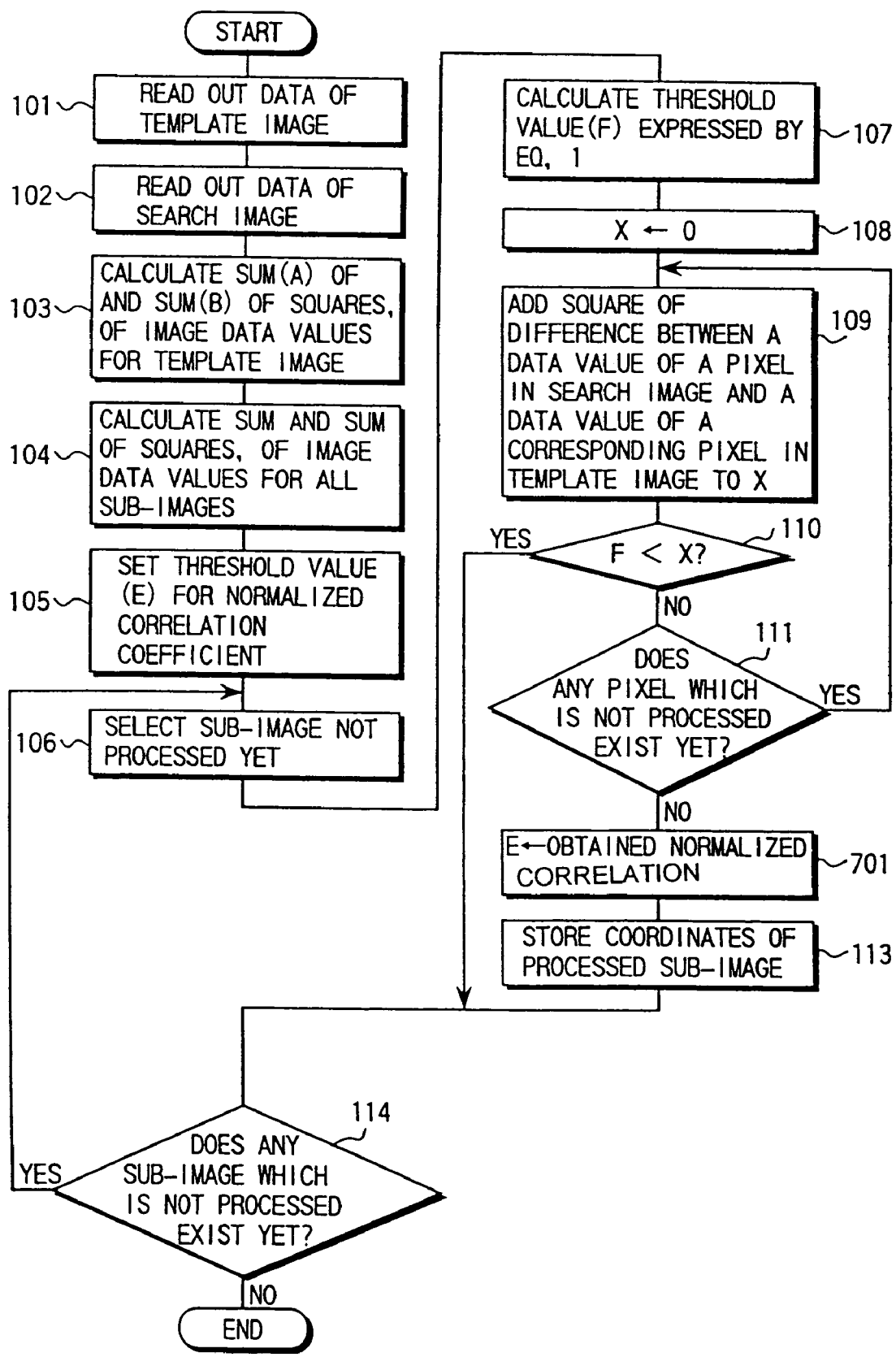
FIG. 7 is a flow chart showing a template matching method of another embodiment according to the present invention.

FIG. 7 shows another embodiment according to the present invention. A flow chart in FIG. 7 shows a modification of the template matching method shown by the flow chart in FIG. 1. Mentioning more in detail, the following step is added to the procedures shown in FIG. 1, that is, if a normalized correlation coefficient calculated for a sub-image is larger than a previously value set to E, the value of E is replaced with the normalized correlation coefficient calculated at this time. Each normalized correlation coefficient is obtained by the following equation 4.

$$r(i, j) = \frac{B + D(i, j) - \frac{2AC(i, j)}{P} - G}{2 \cdot \sqrt{B - \frac{A^2}{P}} \cdot \sqrt{D(i, j) - \frac{(C(i, j))^2}{P}}} \quad (4)$$

, where A: a sum of image data values for the template image,

B: a sum of squares of image data values for the template image,

C: (i, j): a sum of image data values for a sub-image corresponding to a starting point (i, j), D: (i, j): a sum of squares of image data values for a sub-image corresponding to a starting point (i, j), E: the threshold value for a normalized correlation coefficient, G: (i, j): a sum of squares of differences between image data values of pixels in the template image and those of pixels in a sub-image corresponding to a starting point (i, j), and P: the number of pixels in the template image.

In the above equation, r(i, j) is a normalized correlation coefficient for a sub-image corresponding to a starting point (i, j).

In accordance with the method of this embodiment, it is possible, automatically to search and obtain a sub-image having the largest normalized correlation coefficient in the search image. Furthermore, even if an adequate value of E is not known, it is possible by this method to search and obtain a sub-image having the largest normalized correlation coefficient finally.

Figure 8:
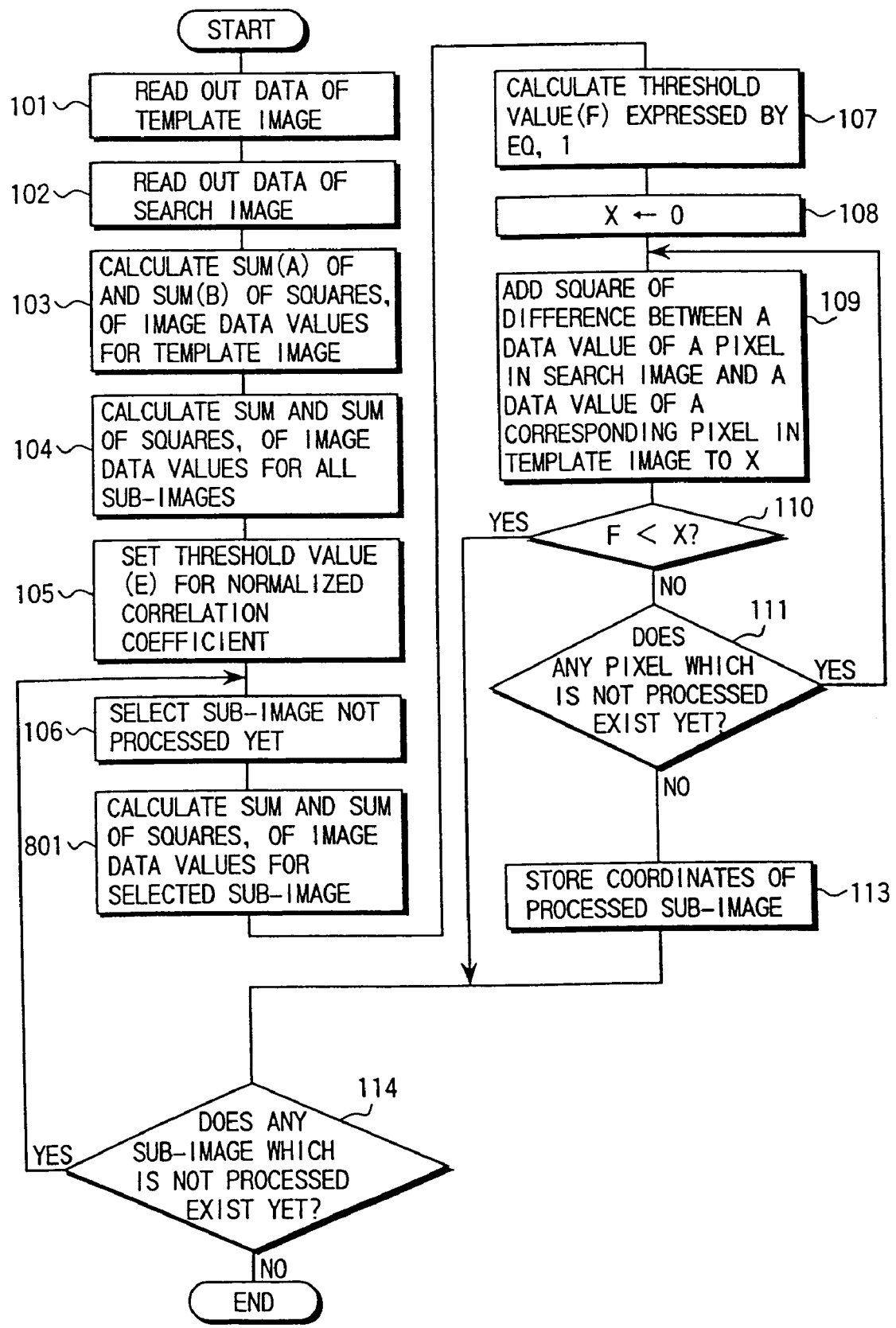
FIG. 8 is a flow chart showing a template matching method of further another embodiment according to the present invention.

FIG. 8 shows another embodiment according to the present invention. A flow chart in FIG. 8 shows a modification of the template matching method shown by the flow chart in FIG. 1. In this method, sums, and sums of squares, of image data values of all pixels in the template and a sub-image to be processed are obtained right before a normalized correlation coefficient between the template image and the sub-image is obtained. In accordance with procedures in the method shown in FIG. 8, it is possible to reduce the capacity of a memory, for storing sums, and sums of squares, of image data values of all pixels in the template and a sub-image to be processed.

In the above explanation, one template image is used in template matching. However, the above-mentioned methods are applicable to template matching in which a plurality of template images are used. For example, those methods are applicable to template matching for color images.

Figure 16:
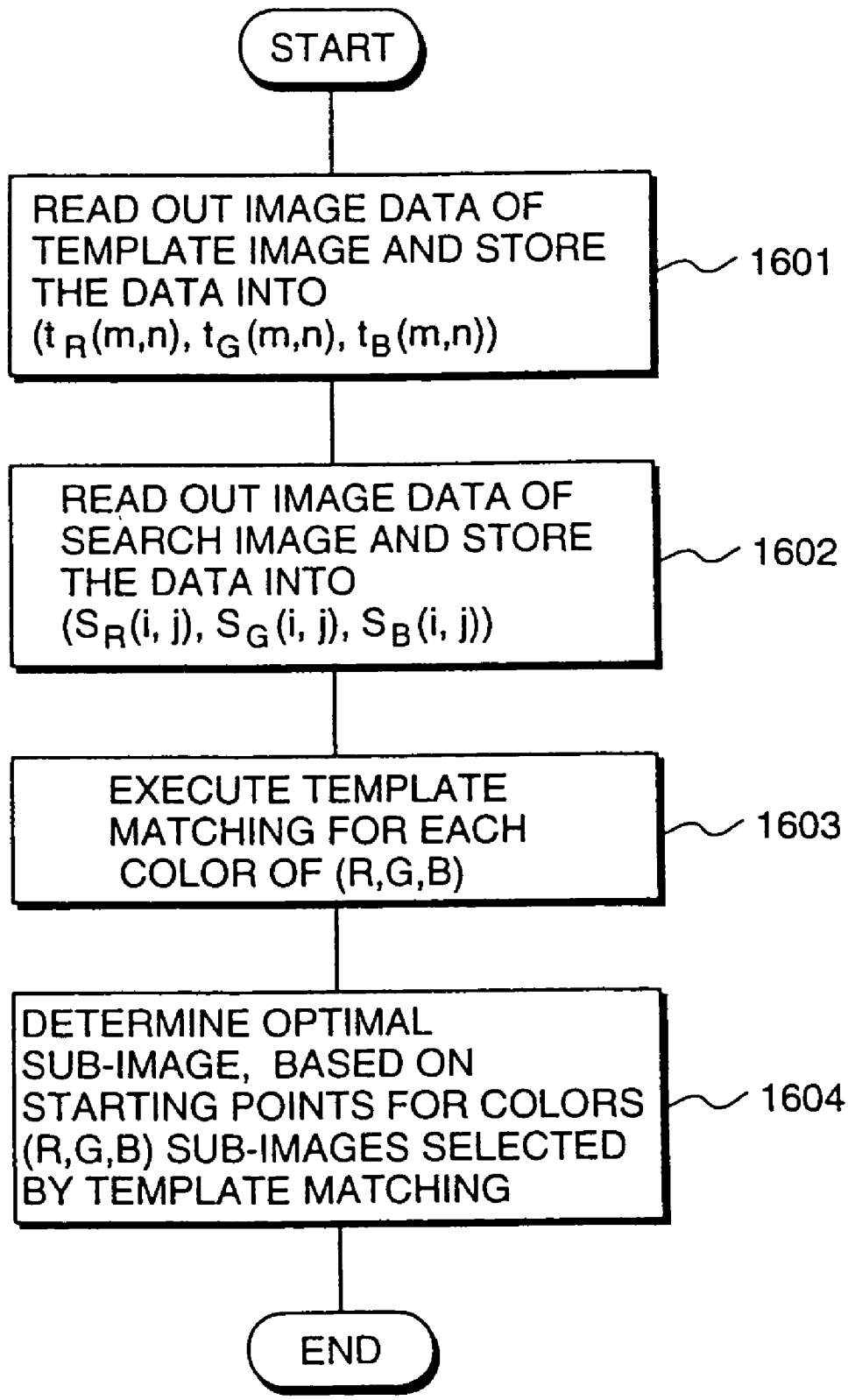
FIG. 16 shows procedures of template matching for a color image, in which the templates matching methods according to the present invention are used.

FIG. 16 shows a template matching method of processing color images. At first, image data of the template image and the search image are taken in from the external memory, for each color component of R (red component), G (green component) and B (blue component) (step 1601). For the taken-in image data of both images, the above-mentioned template matching method is applied to image data of the template image and a sub-image for each color component of R, G and B, and a sub-image having a large normalized correlation coefficient is extracted for each color component (step 1602). Based on the extracted sub-images for three color components, the optimal sub-image is finally determined (step 1603). That is, a sub-image corresponding to the most points among the starting points for the extracted sub-images is finally determined to be as the optimal one.

Hereupon, it is possible to set the threshold value E commonly for three color components R, G and B, or for each color component. A threshold value E setting way adequate to an object image is to be selected. For example, a threshold value E is not set for a specific color component.

Figure 9:
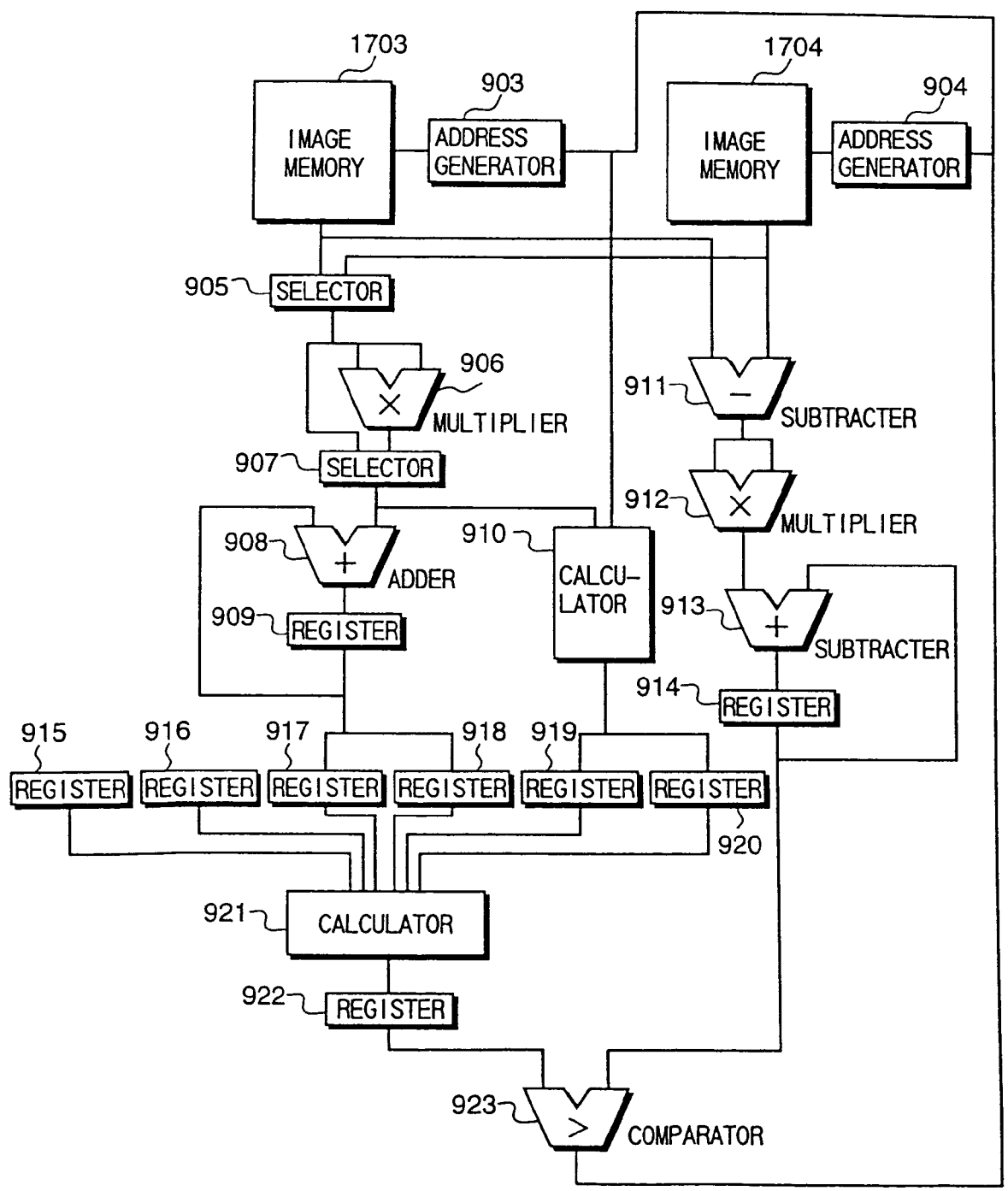
FIG. 9 is a block diagram of a template matching part of an embodiment according to the present invention.

FIG. 17 shows a diagram of an apparatus in which the template matching method according to the present invention is implemented. The apparatus is composed of CPU 1701 which sends a control signal to start a template matching part 1702, the template matching part 1702 taking in image data of the template image and the search image, and performing template matching for the template image and the search image, an image memory 1703 for storing the taken-in image data of the template image, and an image memory 1704 for storing the taken-in image data of the search image. FIG. 9 shows a block diagram of the template matching part 1702. Numerals 903 and 904 indicate address generators for generating read-addresses at the image memories 1703 and 1704, respectively, numeral 905 indicates a selector for selecting and outputting one of data read out of the image memory 1703 and the image memory 1704, and numerals 906 and 907 indicate a multiplier and a selector, respectively. Numerals 908 and 909 indicate an adder and a register, respectively, and cumulative addition is performed by using the adder 908 and the register 909. Numeral 910 indicates a calculator for efficiently calculating a sum, and a sum of squares, of image data values of pixels in a sub-image of the search image.

Numerals 915, 916, 917, 918, 919 and 920 indicate registers for storing the number of pixels in the template image, a threshold value E for a normalized correlation coefficient, a sum of image data values of pixels in the template image, a sum of squares of image data values for the template image, a sum of image data values of pixels in a sub-image to be processed, and a sum of squares of image data values for the sub-image, respectively. Representing the respective values stored in the registers 915, 916, 917, 918, 919 and 920 by P, E, A, B, C and D, numeral 921 indicates a calculator for calculating the following equation 5 for the values P, E, A, B, C and D, and numeral 922 indicates a register for storing the result of the calculation executed by the calculator 921. Moreover, numerals 911, 912, 913 and 914 indicate a subtracter, a multiplier, an adder, and a register for storing an interim result of calculation executed in the adder 913, respectively.

$$F = B + D - \frac{2AC}{P} - 2E \cdot \sqrt{B - \frac{A^2}{P}} \cdot \sqrt{D - \frac{C^2}{P}} \quad (5)$$

Numeral 923 indicates a comparator for comparing an interim result stored in the register 914 with a threshold value stored in the register 922, and outputting a control signal to close a process for evaluation of a similarity for a present sub-image and to start a process for evaluation of similarity for the next sub-image.

Template matching in which the apparatus shown in FIG. 9 is used is executed in accordance with the following procedures. At first, image data of the template image and the search image, which are input by means of a sensor, etc., are stored in the image memories 1703 and 1704, respectively. Moreover, the number of pixels in the template image, and the threshold value for a normalized correlation coefficient, which are sent from CPU 1701, are stored in the respective registers 915 and 916. Next, CPU 1701 controls the selectors 905 and 907 so that image data stored in the image memory 1703 are input to the adder 908. An image data of each pixel in the template image is read out one by one, by means of the address generator 903, and a sum of image data values of all pixels in the template image is obtained by cumulative addition executed by a pair consisting of the adder 908 and the register 909. The result of cumulative addition is stored in the register 917. Similarly, CPU 1701 controls the selectors 905 and 907 so that a square of a value of each image data stored in the image memory 1703 is input to the adder 908. An image data of each pixel in the template image is read out one by one, by means of the address generator 903, and a sum of squares of image data values of all pixels in the template image is obtained by cumulative addition executed by a pair consisting of the adder 908 and the register 909. The result of cumulative addition is stored in the register 918.

Furthermore, CPU 1701 controls the selectors 905 and 906 so that image data stored in the image memory 1704 are input to the adder 910. An image data of each pixel in the search image is read out one by one, by means of the address generator 904, and a sum of image data values of all pixels in a sub-image to be processed, of the template image, is calculated. The result of calculation is stored in the register 919. Similarly, CPU 1701 controls the selectors 905 and 907 so that a square of a value of each image data stored in the image memory 1704 is input to the adder 910. An image data of each pixel in the template image is read out one by one, by means of the address generator 904, and a sum of squares of image data values of all pixels in the sub-image of the search image is calculated. The result of the calculation is stored in the register 920. The calculator 921 calculate equation 5 using the values stored in the registers 915, 916, 917, 918, 919 and 920. The result of the calculation executed by the calculator 921 is stored in the register 922 as a threshold value used for closing a process for evaluation of a similarity for the sub-image to be processed.

The above-mentioned processing is a pre-processing in a process for obtaining a normalized correlation coefficient between a sub-image to be processed and the template image. In the process for obtaining a normalized correlation coefficient, image data are read out one by one for each pixel of the template image from the image memory 1703, and for each pixel of a sub-image to be processed from the image memory 1704. Furthermore, cumulative addition is performed for a square of each difference between an image data value of each pixel in the processed sub-image and that of a corresponding pixel in the template image, and the result of cumulative addition is stored in the register 914. The comparator 923 compares the result of cumulative addition, which is stored in the register 914, with the threshold value stored in the register 922, and outputs a signal corresponding to the result of the comparison. Hereupon, if the result of cumulative addition, which is stored in the register 914, exceeds the threshold value stored in the register 922, a sum, and a sum of squares, of image data values of pixels in the next sub-image neighboring the present sub-image are stored in the registers 919 and 920, respectively. Furthermore, a threshold value used for closing a process for evaluation of a similarity for the next sub-image is stored in the register 922, and the addresses stored in the address generators 903 and 904 are changed to the address of the starting pixel in the template image and an address of a starting pixel in the next sub-image, respectively. At the same time, the changes of the addresses in the address generators 903 and 904 are informed to CPU 1701.

Figure 10:
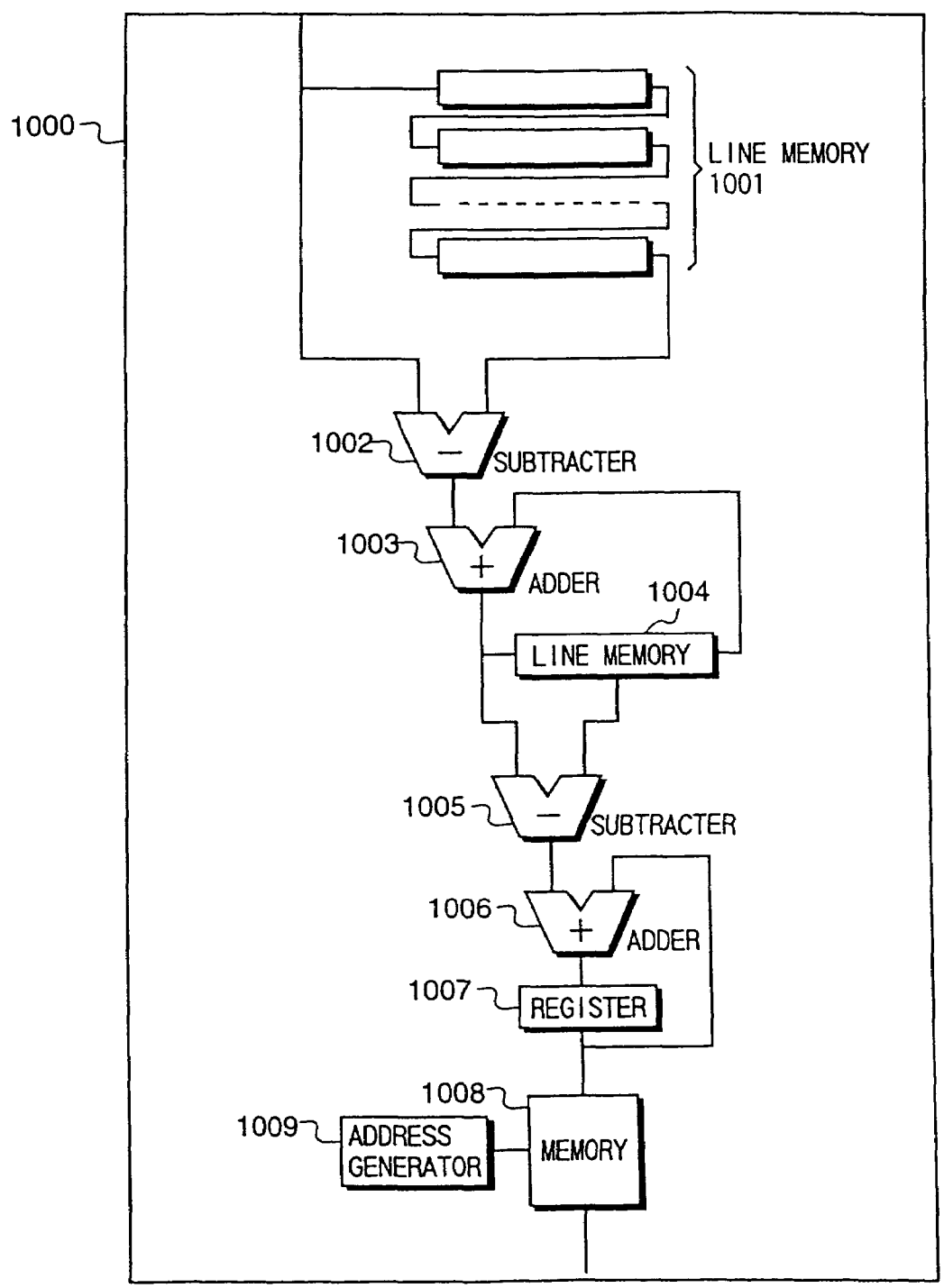
FIG. 10 is a block diagram of a calculator for obtaining a sum, and a sum of squares, of image data values of pixels in a sub-image, in the template matching part.

FIG. 10 shows a block diagram of the calculator 910. Numeral 1000 corresponds to the calculator 910. The calculator 1000 includes a line memory 1001 having lines of at least the same number as that of lines in the template image, of which each line has the capacity of at least the same number as that of pixels in each line of the search image, subtracters 1002 and 1005, adders 1003 and 1006, a line memory having one line which has the capacity of at least the same number as that of pixels in each line of the search image, a register 1007, a memory 1008 for storing a calculation result, and an address generator generating an address used for executing an access to the memory 1008. When a process of evaluating a similarity for a sub-image is started, the line memories 1001 and 1004, and the register 1007 are initialized, that is, the value of 0 is set to those line memories and register.

Operations in which a sum of image data values of pixels in a sub-image of the search image is calculated by the calculator 1000 shown in FIG. 10 will be explained with reference to FIG. 2 and FIG. 3. At first, image data of the search image are input to the calculator 1000 in the order of rasher scanning. An image data (referred to as z) input to the calculator 1000 is stored in the line memory 1001, and is input to the subtracted 1002. Hereupon, it is assumed that a present image data input to the calculator is an image data of a pixel 207 shown in FIG. 3. The computer reads an image data (referred to as y) from the line memory 1001, which is stored at the same column as that at which the data z is stored, in a line positioned upper by N lines from a line in which the image data z is stored, and inputs the image data y to the subtracted 1002. The data y is an image data of a pixel 206 shown in FIG. 3. If a pixel corresponding to the data y does not exist in the search image, the value of 0 is set to the initial value for y. The subtracter 1002 executes a calculation of (z−y). The line memory 1004 stores M sums for one line, each being a sum of image data values of pixels in an area of 1 column and N rows. The adder 1003 adds the value (z–y) calculated by the subtracter 1002 to a sum (referred to as W) of image data values of pixels in the area 205 shown in FIG. 3, and outputs the results of the addition as a sum (referred to as V) of image data values of pixels in the area 204 shown in FIG. 2. Image data output from the adder 103 are stored in the line memory 1004, and input to the subtracted 1005. The subtracted 1005 subtracts a sum (referred to as U) of values of image data read out of the line memory 1004, of pixels in the area 203 shown in FIG. 2, from the above value V, and outputs the result of the subtraction. The adder 1006 calculates a sum of image data values of pixels in the sub-image 201 shown in FIG. 2, by adding the above-mentioned result of the subtraction to a sum (referred to as G) which is stored in the register 1007, of image data values of pixels in the sub-image 202 shown in FIG. 2. The calculated sum of image data values for the sub-image 201 is stored in both of the memories 1007 and 1008.

Next, at every read-out process of a image data value of each pixel in the search image, calculation of a sum of image data values for the next sub-image is repeated, and the result of calculation is stored in the memory 1008. Similarly, calculation of a sum of squares of image data values for the sub-image is carried out. A normalized correlation coefficient for the sub-image is calculated by using a sum, and a sum of squares, of image data values for the sub-image, which are read out of the memory 1008 by means of the address generator 1009, and are stored in the registers 919 and 920 shown in FIG. 9.

Figure 11:
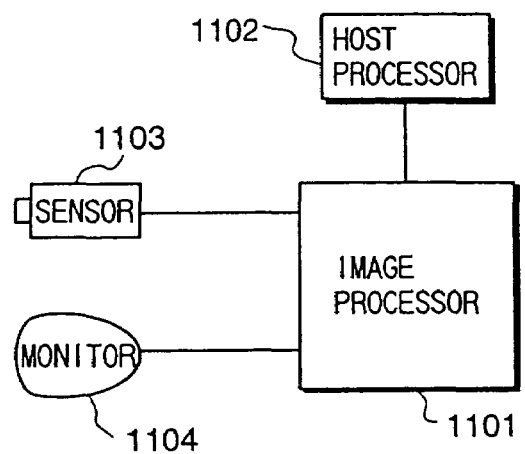
FIG. 11 is a block diagram of an image processing system of an embodiment according to the present invention.
Figure 12:
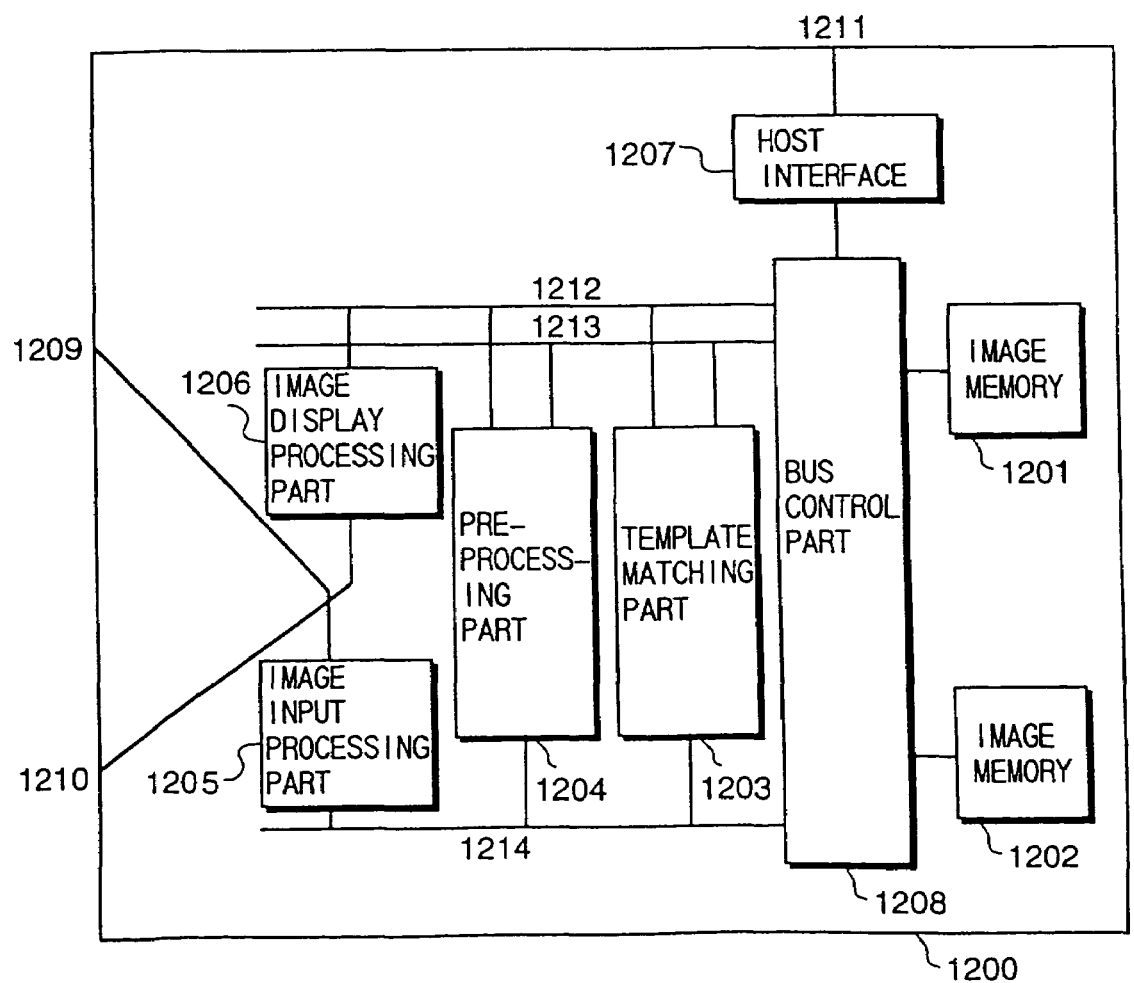
FIG. 12 is a block diagram of an image processing processor of the image processing system shown in FIG. 11.

FIG. 11 shows a block diagram of an image processing system. The image processing system includes an image processing processor 1101, a host processor 1102, a sensor 1103 and a monitor 1104. FIG. 12 is a detailed block diagram of the image processing processor 1101. As shown in FIG. 12, the image processing processor 1101 is composed of image memories 1201 and 1202, a template matching part 1203, an image pre-processing part for performing processes such as a image data filtering process, an image input processing part 1205 for outputting image data input from a terminal 1209 to a write-bus 1214, an image display processing part 1206 for outputting image data from a read bus 1212 to a terminal 1210 as image signals, a host interface 1207 for managing signal transmission between the image processing processor 1101 and the host processor 1102, and a bus control part 1208 for managing a data or address transmission bus control between the image memories 1201 and 1202, and the above-mentioned processing parts or the interface.

The template matching part 1203 includes the same elements as those shown in FIG. 9 other than the address generators 903 and 904, and the bus control part 1208 takes charge of the functions of the generators 903 and 904.

The image processing processor 1101 corresponds to the composition indicated by numeral 1200 shown in FIG. 12. Moreover, the sensor 1103, the monitor 1104 and the host processor 1102 are connected to the terminals 1209, 1210 and 1211, respectively.

Before template matching, image data of the template image and the search image are stored in the image memories 1101 and 1102. Image data of the template image are taken in by the sensor 1103, and stored in the memory 1201 or 1202, via the terminal 1109, the image input processing part 1206, the write bus 1214 and the bus control part 1208, or image information of the template image stored in the host processor 1102 are sent and stored in the image memory 1201 or 1202, via the terminal 1211, the host interface 1207 and the bus control part 1208. Furthermore, image data of the template image taken in by the sensor 1103 are stored in the image memory 1201 or 1202, via the terminal 1109, the image input processing part 1206, the write bus 1214 and the bus control part 1208.

Generally, since image data of the template image and the search image include noise components, pre-processing such as filtering is performed for the image data to remove the noise components. That is, image data of the template image and the search image are read out of the image memory 1201 or 1202, via the bus control part 1208, and the read-buses 1212 or 1213, and the image pre-processing part 1204 implements an adequately pre-processing for the image data. The image data to which the pre-processing was applied are stored in the image memory 1201 or 1202. The procedures for pre-processing of the image data are set in the pre-processing part 1204 from the host processor 1102 via the terminal 1211 and the host interface 1207. Results of the pre-processing are displayed on the monitor 1104 via the bus control part 1208, the write-bus 1214 and the image display processing part 1206, and the results can be confirmed on the monitor 1214.

The template matching part 1203 reads image data of the template image and the search image from the image memory 1201 or 1202 via the bus control part 1208, and performs template matching for the search image by calculating a normalized correlation coefficient for each sub-image of the search image. Hereupon, starting points for sub-images having a large similarity to the template image are stored in accordance of results in the comparison explained with reference to FIG. 9, and after processing for all sub-images of the search image are finished, information on the above-mentioned starting points is sent to the host processor 1102.

In the above-explained embodiments, all calculations are executed by the image processing processor 1101. However, it is possible that the host processor 1101 executes complicated calculations such as a calculation of each threshold value.

In accordance with the present invention, it is possible to performs template matching in which a normalized correlation coefficient is used, without erroneously excluding a sub-image having a large similarity to the template image, at a high speed.

In the following, a moving-average filter according to the present invention will be explained. A hardware composition of an image processing apparatus including the moving-average filter is first explained with reference to FIG. 18. The image processing apparatus includes an image input device 1801 for inputting an image, an image memory 1802 for storing image data of the input image, an image processor 1800 for performing image processing, and an image memory 1805 for storing image data of the image, which are processed by the image processor 1800. Moreover, the image processor 1800 includes a line memory 1803 for holding image data of pixels in one line of the image, a calculation part 1804 for implementing one of later-explained algorithms, and a memory control part 1810 for controlling access to the image memory 1802 and the line memory 1803.

Figure 18:
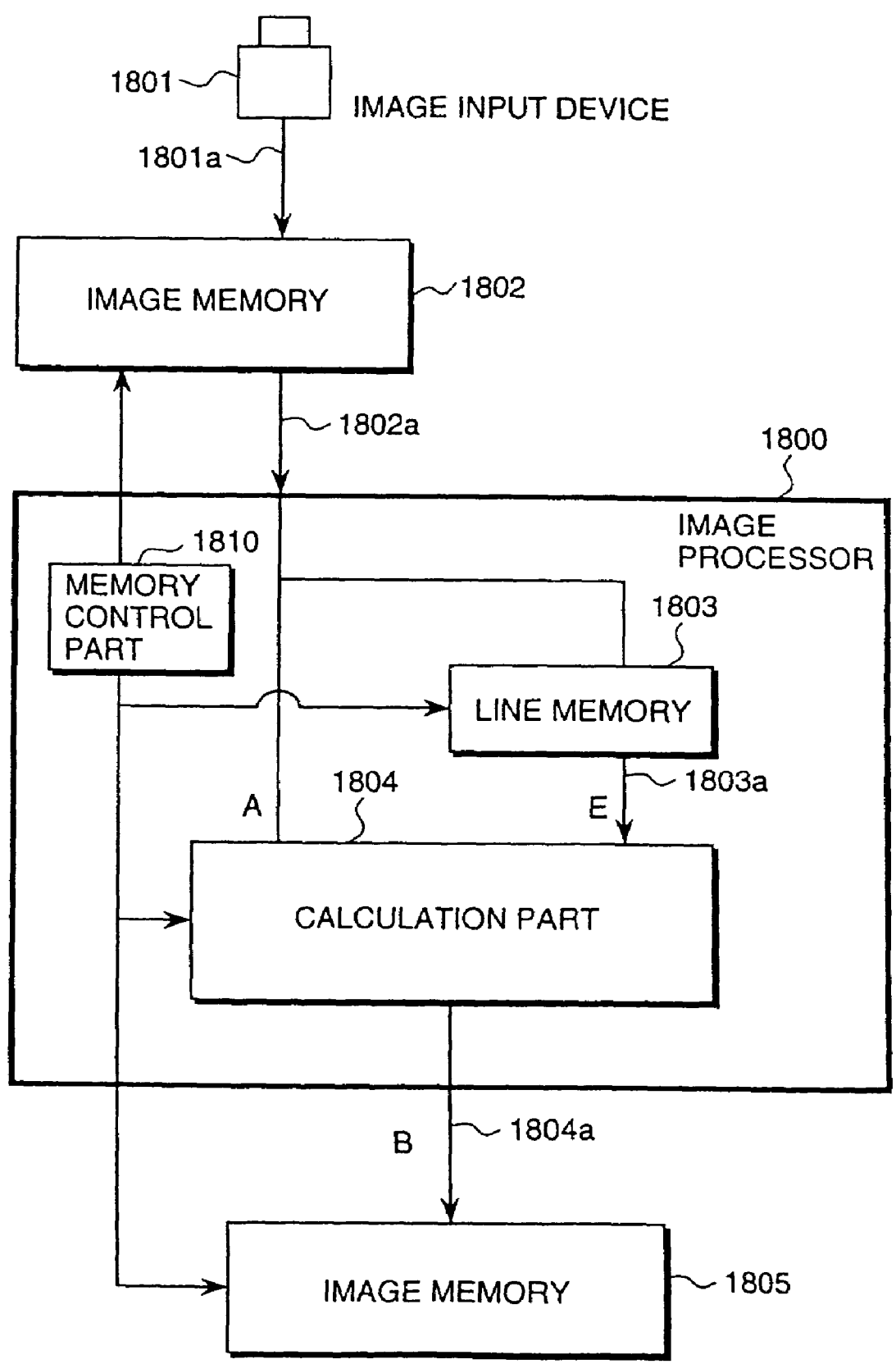
FIG. 18 is a block diagram of a moving-average filter according to the present invention.

In FIG. 18, the memory control part 1810 designates an address for each pixel to the memory 1802, and an image data of the pixel, which is output from the image input device 1801 via a transmission line 1801a, is stored at the designated address of the memory 1802. Furthermore, the memory control part 1810 transmits an instruction for reading each image data to be processed, together with an address of the image data, and the image data read from the address of the memory 1802 is output to the line memory 1803 and the calculation part 1804. The line memory 1803 holds image data of pixels by the amount for one line pixels of the image, which are stored in the memory 1802. The line memory 1803 is composed by using, for example, a shift register. Thus, the line memory 1803 is controlled to hold image data of pixels in one line of the image, and the memory 1803 receives one image data from the image memory 1802 and outputs one image data to the calculation part 1804 via a transmission line 1802a. The calculation part 1804 receives an image data of each pixel, which is output from the image memory 1802, and an image data of each pixel, which is output from the line memory 1803, and implements one of later explained algorithms. The result of the implementation is stored in the memory 1805 via a transmission line 1804a.

Figures 19, 21:
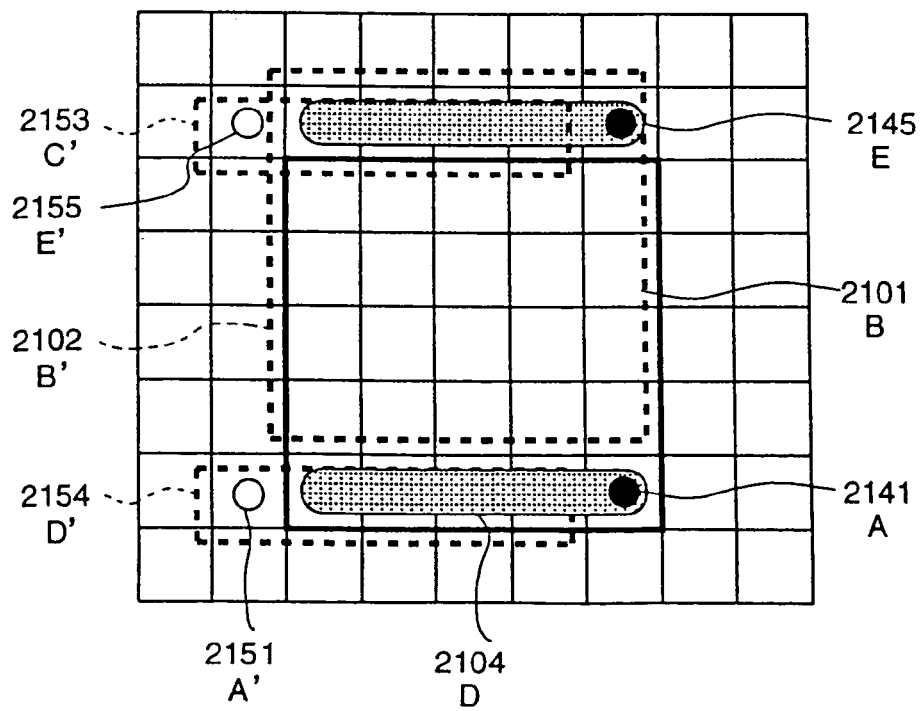
FIG. 19 is an example of a memory address map in an image memory used in the moving-average filter according to the present invention.
FIG. 21 is a diagram for conceptually explaining an algorithm used in the moving-average filter according to the present invention.

FIG. 19 shows a memory address map of the image memory 1802. The image memory 1802 is composed by using, for example, a SDRAM (synchronous DRAM), and image data of pixels in the image are stored in the image memory 1802, according to the address map shown in FIG. 19. That is, the image memory 1802 composed by using a DRAM, a SDRAM, etc., has the capacity of image data for an area of m rows and n columns, where n and m are natural numbers. Usually, access to a DRAM or a SDRAM is performed by designating a row address and a column address. In FIG. 19, the row address is expressed by m, and the column address is expressed by n. In an embodiment of the present invention, the memory control part 1810 executes a memory access control wherein since a high frequency cycle mode such as a high speed page mode can be used by designating a row address and a plurality of successive column addresses, it becomes possible to realize a high-speed image data write-in to the image memory 1802 and a high-speed image data read-out of the image memory 1802. Hereupon, each image data is expressed, for example, by an eight-bit data.

FIG. 20A shows an image which is expressed by an area of 9 pixels in the row direction and 8 pixels in the column directions. Numerals 211–289 indicate respective pixels in the image. The memory control part 1810 controls image data write-in and image data read-out by designating addresses of the image data in the image memory 1802. In image data read-out processing, addresses for all pixels in every one line of the image are designated at one time, and image data corresponding to the designated address are continuously read out. In accordance with this embodiment, for the image shown in FIG. 20A, it is possible that after nine image data from an image data of the most left pixel 211 to an image data of the most right pixel 219 in the top line are read out in turn, nine image data of pixels in another line, for example, image data of pixels 261–-269 in the sixth row, are read out in turn. Moreover, FIG. 20B shows an image, in which pixels are indicated by numerals 211' to 289', obtained by performing a moving-average filtering process for a kernel region of 5 pixels×5 pixels, of the image shown in FIG. 20A. The position of a central pixel in the kernel area is changed from 211 to 219 in the row direction, next from 221 to 229, further from 231 to 239, and so forth.

In the following, an algorithm of moving-average filtering used in this embodiment will be explained with reference to FIG. 21. In FIG. 21, numeral 2101 indicates a region of which a moving-average (referred to as present region average value) is presently to be processed, and the present region average value is expressed by B. Numeral 2141 indicate a pixel located at the most right and lowest position in the kernel region 2101, and an image data value of the pixel 2141 is expressed by A. Numeral 2102 indicate a kernel region set at the position upper by one line from the kernel region 2101, and a moving-average of the kernel region 2102 is expressed by B' which was obtained previously by one line to the moving-average B. Numeral 2103 indicate an upper line area in the top line in the kernel region 2102, and a sum of image data values of pixels in the upper line area 2103 is expressed by C. Numeral 2104 indicate a lower line area of the bottom line in the kernel region 2101, and a sum of image data values of pixels in the line area 2104 is expressed by D. Numeral 2145 indicate a pixel located at the most right and top position in the kernel region 2102, and an image data value of the pixel 2141 is expressed by E. Numeral 2153 indicates an upper line area obtained by shifting the upper line area 2103 by one pixel in the left direction, and a sum of image data values of the upper line area 2153 is expressed by C'. Numeral 2154 indicates a lower line area obtained by shifting the lower line area 2104 by one pixel in the left direction, and a sum of image data values of the lower line area 2154 is expressed by D'. Numeral 2151 indicates a pixel located at the most left position in the lower line area 2154, and an image data value of the pixel 2151 is expressed by A'. Numeral 2155 indicates a pixel located at the most left position in the upper line area 2153, and an image data value of the pixel 2153 is expressed by E'.

In an algorithm used for this embodiment according to the present invention, the moving-average value B to be presently obtained is calculated by adding (the sum D of image data values of the lower line area–the sum C of image data values of the upper line area)/(the number N of pixels in the kernel region for moving-average filtering) to the moving-average value B' of the region 2102 set at the position upper by one line from the region 2101. Furthermore, the value (the sum D of image data values of the lower line area–the sum C of image data values of the upper line area) is obtained by adding (the image data value A of the most right and lowest pixel 2141–the image data value E of the most right and top pixel 2145) to and subtracting (the image data value A' of the most left and lowest pixel 2154–the image data value E' of the most left and top pixel 2153) from (the sum C' of the upper line area shifted by one pixel in the left direction–the sum D' of the lower line area shifted by one pixel in the left direction). The above-mentioned algorithm is expressed by the following equations 6 and 7.

$$D-C=(D'-C')+(A-E)-(A'-E') \quad\quad 6$$

$$B=B'+(D-C)/N \quad\quad 7$$

The moving-average value B', the value (D'–C') and the value (A'–E') which were previously calculated for the kernel region upper by one line are held, and the moving-average value B is obtained, according to equations 6 and 7, by using the above values and reading the image data value A and the image data value E stored at the address upper by five lines of that of the value A.

Figure 22:
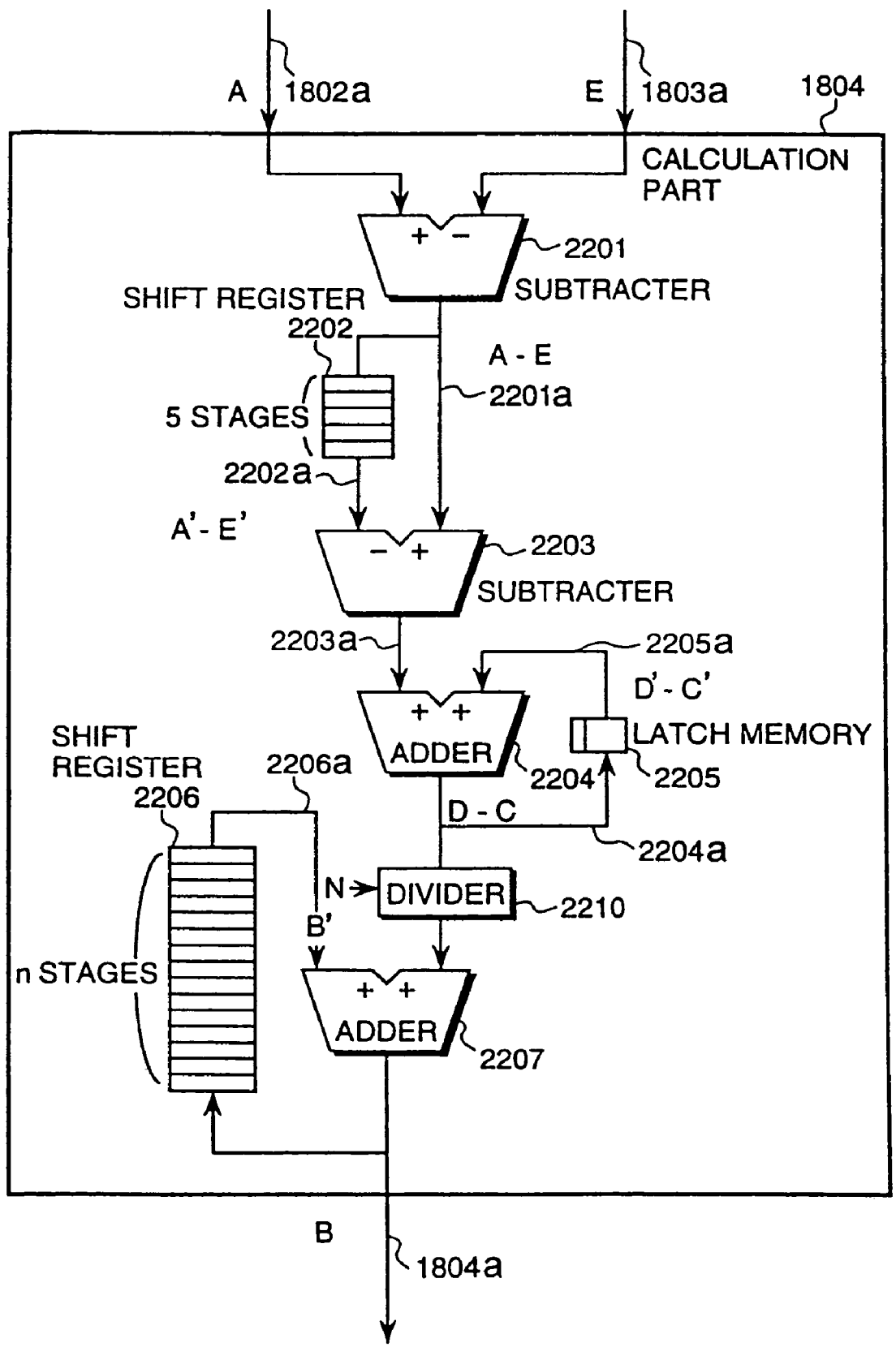
FIG. 22 is a circuit block diagram of a calculation part of the moving-average filter according to the present invention.

FIG. 22 shows a schematic circuit diagram of the calculation part 1804 in which the above-mentioned algorithm for moving-average filtering is implemented. The calculation part 1804 includes a subtracter 2201 for calculating (A–E), a shift register 2202 for holding obtained values by the amount for the region width of the kernel region 2101, which has the capacity for image data of pixels in an line area corresponding to the width of the kernel region, (the capacity is five words for five pixels in an example shown in FIG. 21), a subtracter 2203 for calculating ((A–E)–(A'–

E')), an adder 2204 for calculating (D−C), a latch memory for holding (D'−C'), a shift register 2206 storing calculation results by the amount for one line of the image (that is, n words), and an adder 2207 and a divider 2210 which calculate B.

The calculation part 1804 obtains the moving-average value B of the region 2101 by taking in the image data values A and E of the most right and lowest pixel and the most right and top pixel. The subtracter 2201 for calculating (A−E) takes in the image data value A via the transmission line 1803a and the image data value E via the transmission line 1802a, further executes subtraction of (A−E), and outputs the result of the subtraction to a transmission line 2201a. The shift register 2202 receives each output signal from the subtracter 2201 and holds the output signals by the amount for the region width (five signals in the example shown in FIG. 21). Consequently, an output signal from the shift register 2202 is equal to a value (A−E) shifted by 5 pixels in the left direction, that is, a value (A'−E'). The subtracter 2203 for calculating ((A−E)−(A'−E')) calculates ((A−E)−(A'−E')) by receiving an output signal from the subtracter 2201 and an output signal from the shift register 2202, and outputs the results of the subtraction to a transmission line 2203a. The adder 2204 for calculating (D−C) adds five output signals of ((A−E)−(A'−E')) output from the subtracter 2203, further calculates (D−C) by using the result of the addition and (D'−C') output from the latch memory 2205, and outputs the result of the calculation to a transmission line 2204a. The latch memory 2205 for holding (D−C) output from the adder 2204 delays the held (D−C) by one processing step, and outputs it as (D'−C') to a transmission line 2205a. The divider 2210 receives (D−C) output from the adder 2204, further divides the (D−C) by the number N of pixels in the kernel region, and outputs the result of the division to the adder 2207. Hereupon, the number N can be set in advance, or input by a user. The shift register 2206 receives an output signal from the adder 2207 for calculating B in turn, and holds the output signals by the amount for one line of the image (n words for the image shown in FIG. 19). Therefore, an output signal from the shift register 2206 is a value B obtained previously by one line, that is, a moving-average value B' of the region 2102 shown in FIG. 21. The adder 2207 for calculating B receives an output signal from the shift register 2206 and an output signal from the divider 2210, further calculates a moving-average value B of the present kernel region, and outputs the result of the calculation to the transmission line 1804a.

In accordance with the above-mentioned procedures, the algorithm based on equations 6 and 7 is implemented. Hereupon, it is possible that the calculation part 1804 performs only addition or subtraction processing and outputs results of final addition processing to the image memory 1805, furthermore, an outside processor performs the division calculation in place of the divider 2210 and obtains the moving-average value B.

In the following, operations of the image processing apparatus will be explained. Each of image data for the image, which are taken in through the image input device 1801, is stored at an address of the image memory 1802 via the transmission line 1801a, which is designated by the memory control part 1810. The image processor 1800 reads out image data stored in the image memory 1802 via the transmission line 1802a. As mentioned above, since the memory control part 1810 designates a row address and a plurality of successive column addresses, a high frequency cycle mode such as a high-speed page mode is applicable, and image data can be read out of or written into the image memory 1802 at a high speed. Image data read out of the image memory 1802 are input to the calculation part 1804 and the line memory 1803. Inputting of image data to each of the calculation part 1804 and the line memory 1803 is performed at different timing. For example, at first, the memory control part 1810 control image data storing so that in the example shown in FIG. 21, image data of pixels in one line including the most right and lowest pixel 2141 are read out and stored in the line memory 1803. Next, the memory control part 1810 control image data reading so that an image data of the most right and lowest pixel 2141 is read out of the image memory 1802, and at the same time, an image data of the pixel 2145 is read out of the line memory 1803. The calculation part 1804 shown in FIG. 22 takes in the image data value A of the pixel 2141 and the image data value E of the pixel 2145, further calculates the moving-average value B, and outputs the result of the calculation. The calculated moving-average value B is input to the image memory 1805 via the transmission line 1804a, and stored at an address of the image memory 1805, which is designated by the memory control part. Similarly, in order to obtain a moving-average value of the next kernel region (the kernel region corresponding to the central pixel shifted by one pixel in the right direction from the central pixel of the previous kernel region), the memory control part 1810 controls image data storing so that an image data of a pixel which is shifted by one pixel in the right direction from the pixel 2141 is read out of the image memory 1802, and at the same time, an image data of a pixel which is shifter by one pixel in the right direction from the pixel 2145 is read out of the line memory 1803. If a central pixel of a kernel region transfers to the lower next line, image data of pixels for one line in the lower next line under the pixel 2145 are stored in the line memory 1803, and an image data of each pixel is read out in turn.

When a moving-average value is initially obtained, calculating of the moving-average value can be performed by setting dummy data to each shift register.

As mentioned above, by providing the line memory 1803, since it is possible to execute successively calculating of each moving-average value by continuously reading out each image data value E corresponding to the pixel 2145 and each image data value A corresponding to the pixel 2141 in the kernel region, in turn in the horizontal direction, memory access required to obtain a moving-average value can be more quickly than in conventional methods.

In this embodiment, image data of pixels in a line including the pixel 2145 are stored in the line memory 1803. However, it is also possible to store image data of pixels in a line including the pixel 2141 are stored in the line memory 1803. Furthermore, although image data of one line pixels are stored in the line memory 1803, it is also to store image data of five lines in the line memory 1803. In this application, since the line memory 1803 can be regarded as a delay circuit, image data read out of the image memory 1802 can be simultaneously input to the calculation part 1804 and the line memory 1803. Thus, reading image data necessary to obtain each moving-average from the image memory 1802 should be only performed at one time.

In accordance with this embodiment, since access to the image memory can be continuously performed in the horizontal direction, moving-average values can be obtained at a high speed.

In the following, an algorithm used in another embodiment will be explained with reference to FIG. 23. Numeral 2301 indicates a kernel region 2301 of which a moving-average value is to be presently obtained, representing the moving-average value as B. Numeral 2341 indicates a pixel located at the most right and lowest position in the region 2301, representing the image data value of the pixel 2341 as A. Numeral 2303 indicates a vertical line area at the left outside of a previous kernel region 2302, representing a sum of image data values of pixels in the line area 2303 as F. Numeral 2304 indicates a vertical line area at the most right position in the region 2301, representing a sum of image data values of pixels in the line area 2304 as G. Numeral 2345 indicates a pixel upper by one line from the top position in the vertical line area 2304, representing the image data value of the pixel 2345 as E. Numeral 2302 indicates the previous kernel region shifted from the kernel region 2301 by one pixel in the left direction, representing a moving-average value of the region 2302 as B". Numeral 2314 indicates a vertical line area upper by one line from the vertical line area 2304 located at the most right position in the kernel region 2301, representing a sum of image data values of pixels in the line area 2304 as G'. The moving-average value B" of the region 2302 was obtained previously by one pixel before the moving-average value B of the region 2301 is obtained, and the sum G' of the line area was obtained previously by one line before the sum G of the line area 2304 is obtained. That is, the moving-average value B" of the region 2302 and the sum G' for the area 2314 were already obtained and are held.

Figure 23:
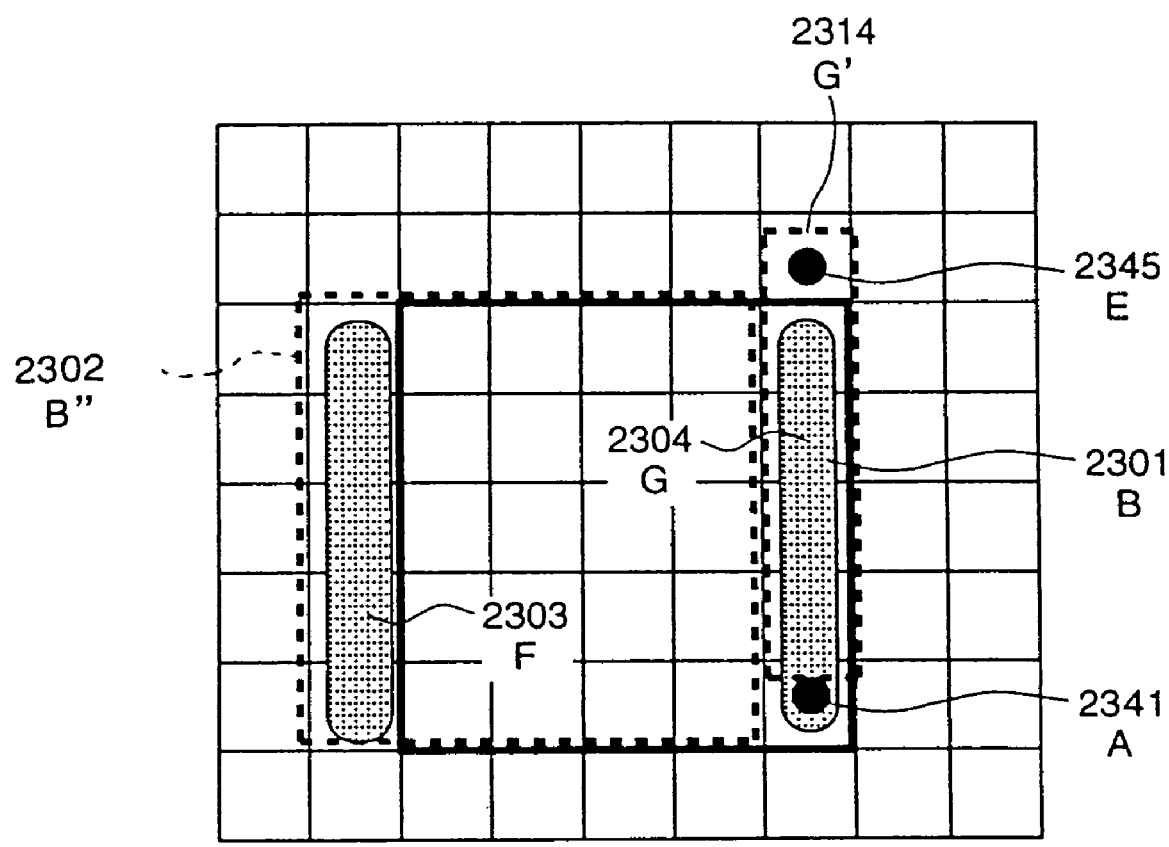
FIG. 23 is a diagram for conceptually explaining another algorithm used in the moving-average filter according to the present invention.

In the algorithm shown in FIG. 23, the moving-average value of the region 2301 to be presently obtained is calculated by adding (the sum G of the vertical line area 2304 at the right side position–the sum F of the vertical line area 2303 at the left side position)/N to the moving-average value B" of the kernel region for the pixel previous by one pixel. Moreover, the sum G for the vertical line area 2304 at the right side position is obtained by adding the image data value A of the pixel 2341 to the sum G' for the vertical line area 2304, and subtracting the image data value E of the pixel 2345 from the result of the addition. This algorithm is expressed by equations 8 and 9.

$$G = G' + (A - E) \quad (8)$$

$$B = B'' + (G - F)/N \quad (9)$$

The moving-average value B is obtained by holding the moving-average value B" and the sums G' and F, which were obtained for the central pixel previous by one pixel, further reading the image data value A of the pixel 2341 and the image data value E of the pixel 2345 in the same column as that of the pixel 2341 and at the position upper by five lines from the most right and lowest pixel, and using those values in equations 8 and 9.

Figure 24:
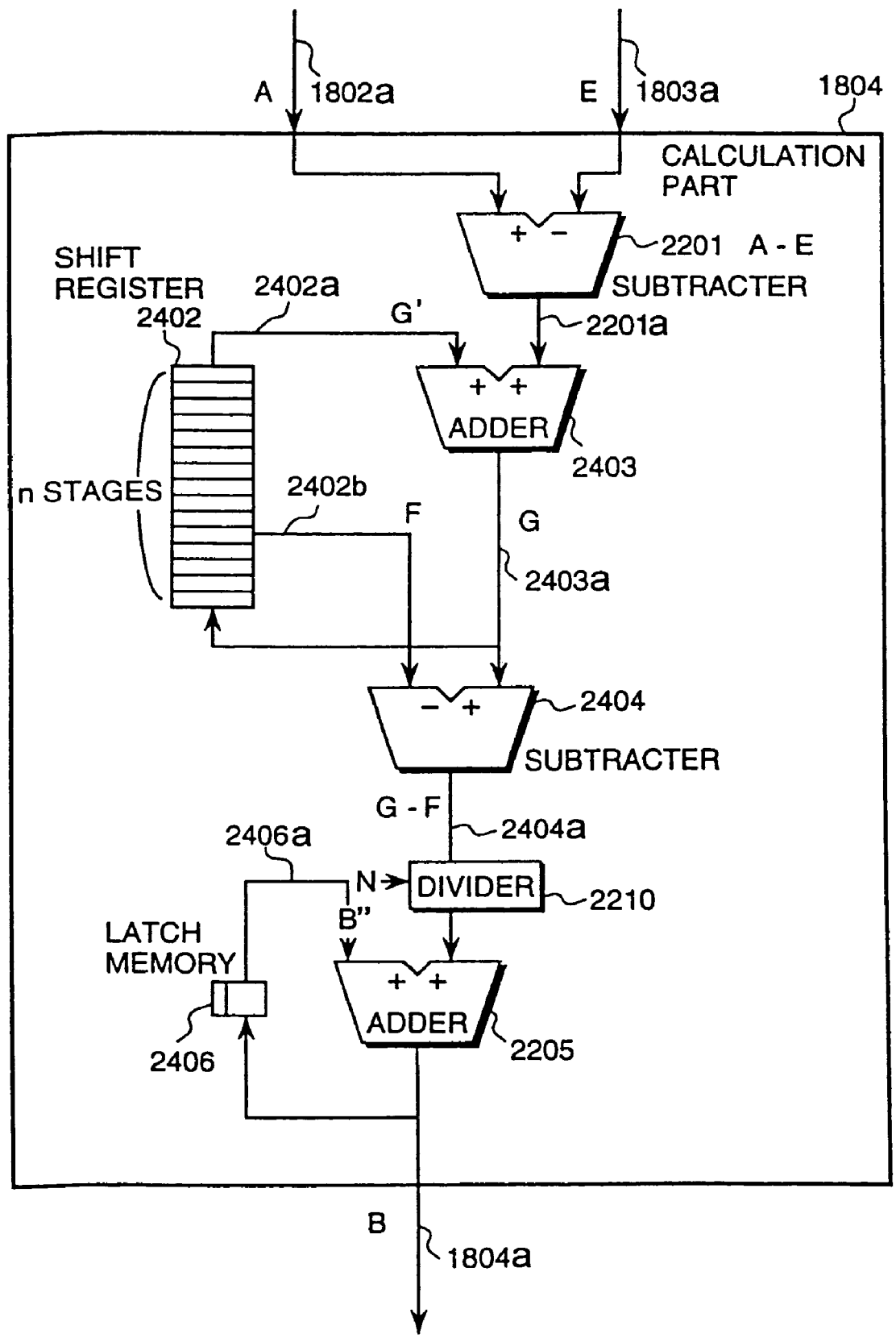
FIG. 24 is a circuit block diagram of another calculation part of the moving-average filter according to the present invention.

FIG. 24 shows a schematic circuit diagram of a calculation part 1804 in which this algorithm for obtaining a moving-average value is implemented. A hardware composition of an image processing apparatus can be composed similarly to that of the apparatus shown in FIG. 18 other than the calculation part 1804. Operations of the apparatus for implementing this algorithm is similar to those of the apparatus shown in FIG. 18, and image data of the image are read out in the horizontal direction.

In FIG. 24, the calculation part 1804 includes the subtracter 2201 for calculating (A–E), a shift register 2402 for holding values G by the amount for one line, an adder 2403 for calculating G, a subtracter 2404 for calculating (G–F), an adder 2405 for calculating B, a latch memory 2406 for holding B" and a divider 2210.

The calculation 1804 takes in the image data value A of the most right and lowest pixel and the image data value E of the top pixel 2345 in the vertical area 2314, which are shown in FIG. 23, and obtains the moving-average value B of the region 2301. The subtracter 2201 for calculating (A–E) receives the image data value A of the pixel 2341 via the transmission line 1802a and the image data value E of the top pixel 2345 in the vertical area 2314 via the transmission line 1803a, further performs subtraction of (A–E), and outputs the result of the subtraction to the transmission line 2201a. The shift register 2402 receives an output signal from the adder 2403 for calculating G via a transmission line 2403a, and holds values of G by the amount of one line. Therefore, an output signal from the shift register 2402 is a value G obtained previously by one line, that is, the value G' shown in FIG. 23. Moreover, an output signal from the fifth stage of the shift register 2402 is a value G obtained previously by the width of the kernel region, that is, the value F shown in FIG. 23. The adder 2403 for calculating G calculates G by using an output signal from the subtracter 2201 for calculating (A–E) and an output signal G' from the shift register 2402, and output the results of the calculation to a transmission line 2403a. The subtracter 2404 for calculating (G–F) calculates (G–F) by using an output signal G from the adder 2403 for calculating G and an output signal F from the shift register 2402, and outputs the result of the calculation to a transmission line 2404a. The divider 2210 receives an output signal (G–F) from the subtracter 2404 for calculating (G–F), divide (G–F) by the preset number N of pixels in the kernel region, and outputs the result of the division. The adder 2405 for calculating B receives an output signal B" from the latch memory 2406 for holding a value B" and an output signal of the divider 2210, further obtains the moving-average value B of the present kernel region, and outputs the obtained moving-average value via the transmission line 1804a. The latch memory 2406 for holding B" receives an output signal from the adder 2405 for calculating B, further delays the received output signal by one pixel, and outputs it as B" via a transmission line 2406a.

In accordance with the above-mentioned operations, the algorithm expressed by equations 8 and 9 is implemented.

In accordance with this embodiment also, since access to the image memory can be continuously performed in the horizontal direction, moving-average values can be obtained at a high speed.

As for the shift register 2402, three port memories are necessary, that is, one port for taking in one output signal from the transmission line 2403a and two ports for outputting two signals to the transmission lines 2402a and 2402b. Generally, it is difficult to incorporate a three port register in a processor. Therefore, in a case in which two registers having two ports, that is, one data input port and one data output port, are used, the calculation part 1804 can be composed as shown in FIG. 25, and FIG. 25 shows a schematic circuit diagram of the calculation part 1804 performing the algorithm shown in FIG. 23, similarly to the part 1804 shown in FIG. 24.

Figure 25:
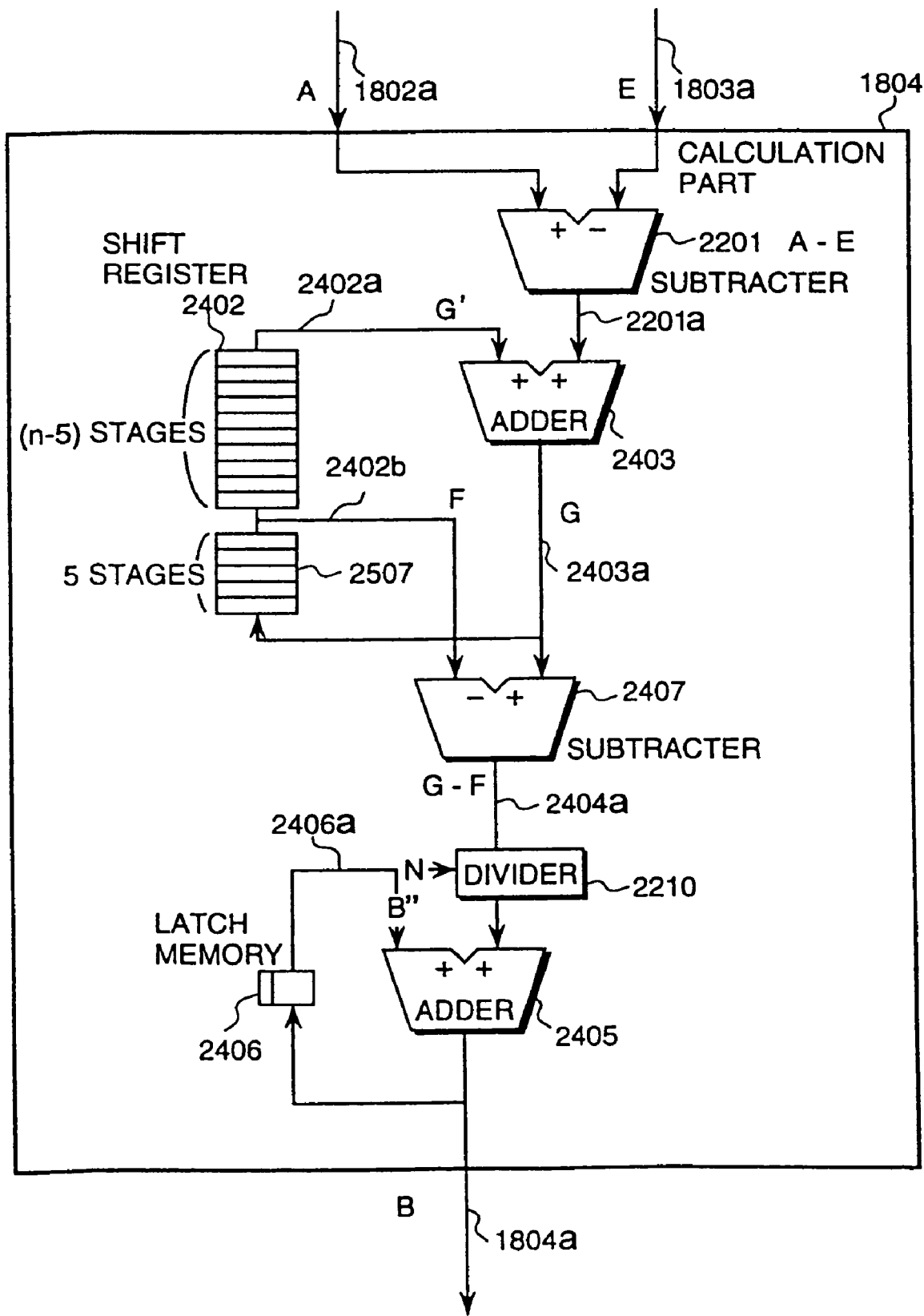
FIG. 25 is a circuit block diagram of another calculation part of the moving-average filter according to the present invention.

In FIG. 25, the calculation part 1804 includes the subtracter 2201 for calculating (A–E), a shift register 2502 for holding values G by the number of (one line pixels–pixels by the region width), the adder 2403 for calculating G, the subtracter 2404 for calculating (G–F), the adder 2405 for calculating B, the latch memory 2406 for holding B", a shift register 2507 for holding values G by the amount for the region width, and the divider 2210.

The subtracter 2201 for calculating (A–E) receives the image data value A of the pixel 2341 via the transmission line 1802a, and the image data value E of the top pixel 2345 in the vertical line area 2134 via the transmission line 1803a, further perform subtraction of (A–E), and outputs the result of the subtraction to the transmission line 2201a. The shift register 2502 for holding values G by the number of (one line pixels–pixels by the region width) receives an output signal from the shift register 2507 for holding values G by the amount for the region width via a transmission line 2402b, and holds values G by the amount of (one line pixels–pixels by the region width, that is, (n–5)) in turn. The shift register 2507 for holding values G receive a value G, and holds values G by the amount for the region width. Therefore, an output signal from the shift register 2507 is a value G obtained previously by the width, that is, the value F shown in FIG. 23. The adder 2403 for calculating G calculates G by using an output signal (A–E) from the subtracter 2201 for calculating (A–E) and an output signal G' from the shift register 2507 for holding values G by the amount for the region width, and outputs the result of the calculation to the transmission line 2403a. The subtracter 2404 for calculating (G–F) calculates (G–F) by using an output signal G from the adder 2403 for calculating G and an output signal F from the shift register 2507 for holding values G by the amount for the region width, and outputs the result of the calculation to a transmission line 2404a. The divider 2210 receives an output signal (G–F) from the subtracter 2404 for calculating (G–F), further divide (G–F) by the preset number N of pixels in the kernel region, and outputs the result of the division. The adder 2405 for calculating B receives an output signal B" from the latch memory 2406 for holding a value B" and an output signal of the divider 2210, further obtains the moving-average value B of the present kernel region, and outputs the obtained moving-average value B via the transmission line 1804. The latch memory 2406 for holding B" receives an output signal B from the adder 2405 for calculating B, delays the received output signal by one pixel, and outputs it as B" via a transmission line 2406a.

In accordance with the above-mentioned operations, the algorithm expressed by equations 8 and 9 is implemented.

By the calculation part 1804 of which the composition is shown in FIG. 25, it is possible to use two registers having two ports, that is, one data input port and one data output port, in place of a register of three ports.

In the following, an algorithm used in another embodiment will be explained with reference to FIG. 26. Numeral 2301 indicates a kernel region of which a moving-average value is to be presently obtained, representing the moving-average value as B. Numeral 2341 indicates the most right and lowest pixel in the region 2301, representing the image data value of the pixel 2341 as A. Numeral 2303 indicates a vertical line area at the left outside of the region 2301, representing a sum of image data values of pixels in the vertical line area 2303 as F. Numeral 2354 indicate the lowest pixel in the vertical line area 2303, representing an image data value of the pixel as A'. Numeral 2302 indicates a previous kernel region shifted from the kernel region 2301 by one pixel in the left direction, representing a moving-average value of the region 2302 as B'. Numeral 2313 indicates a vertical line area upper by one line from the vertical line area 2303, which is the most left vertical line area in the kernel region processed previously by one line to the kernel region 2302, representing a sum of image data values of pixel in the line area 2313 as F'. Numeral 2314 indicates a vertical line area upper by one line from the top pixel of the vertical line area 2304, representing a sum of image data values of pixels in the line area 2314 as G'. The numeral 2355 indicates the top pixel in the vertical line area 2313, representing an image data value of the pixel 2355 as E'. The image data values A' and E' of the pixels 2354 and 2355 are latched as the previous image data values A and E of the pixels 2341 and 2345 processed previously by the region width. Furthermore, the moving-average value B' was obtained as the moving-average value B obtained previously by the region width, and the sums G' and F' for the vertical line areas 2314 and 2313 were also obtained as the sums G and F of the vertical line areas 2304 and 2303 processed previously by one line. Therefore, the image data values of the pixels 2354 and 2355, and the sums for the vertical line areas 2313 and 2314, and the region 2302, were already obtained and are held in the registers.

In this algorithm, the moving-average value B of the present kernel region is obtained by adding (the sum G of the most right vertical line area 2304–the sum F of the most left vertical line area 2302)/N to the moving-average value B' of the kernel region processed previous by one pixel. Moreover, the value of (the sum G of the most right vertical line area–the sum F of the most left vertical line area) is obtained by adding (the image data value A of the lowest pixel in the vertical line area 2304–the image data value E of the top pixel in the vertical line area 2345) to (the sum G' of the vertical line area 2314–the sum F' of the vertical line area 2313) and subtracting (the image data value A' of the lowest pixel in the vertical line area 2303–the image data value E' of the top pixel in the vertical line area 2313) from the result of the addition. This algorithm is expressed by equations 9 and 10.

$$G-F=(G'-F')+(A-E)-(A'-E') \qquad 10$$

$$B=B'+(G-F)/N \qquad 11$$

The moving-average value B is obtained by holding the moving-average value B' and the values (A'–E') and (G'–F'), which were previously obtained by one pixel, and reading the image data value A, and the image data value E of the pixel located in the same column as that of the most right and lowest pixel 2341 and at the position upper by five lines, from the image memory 1802, and using the values in equations 9 and 10.

Figure 27:
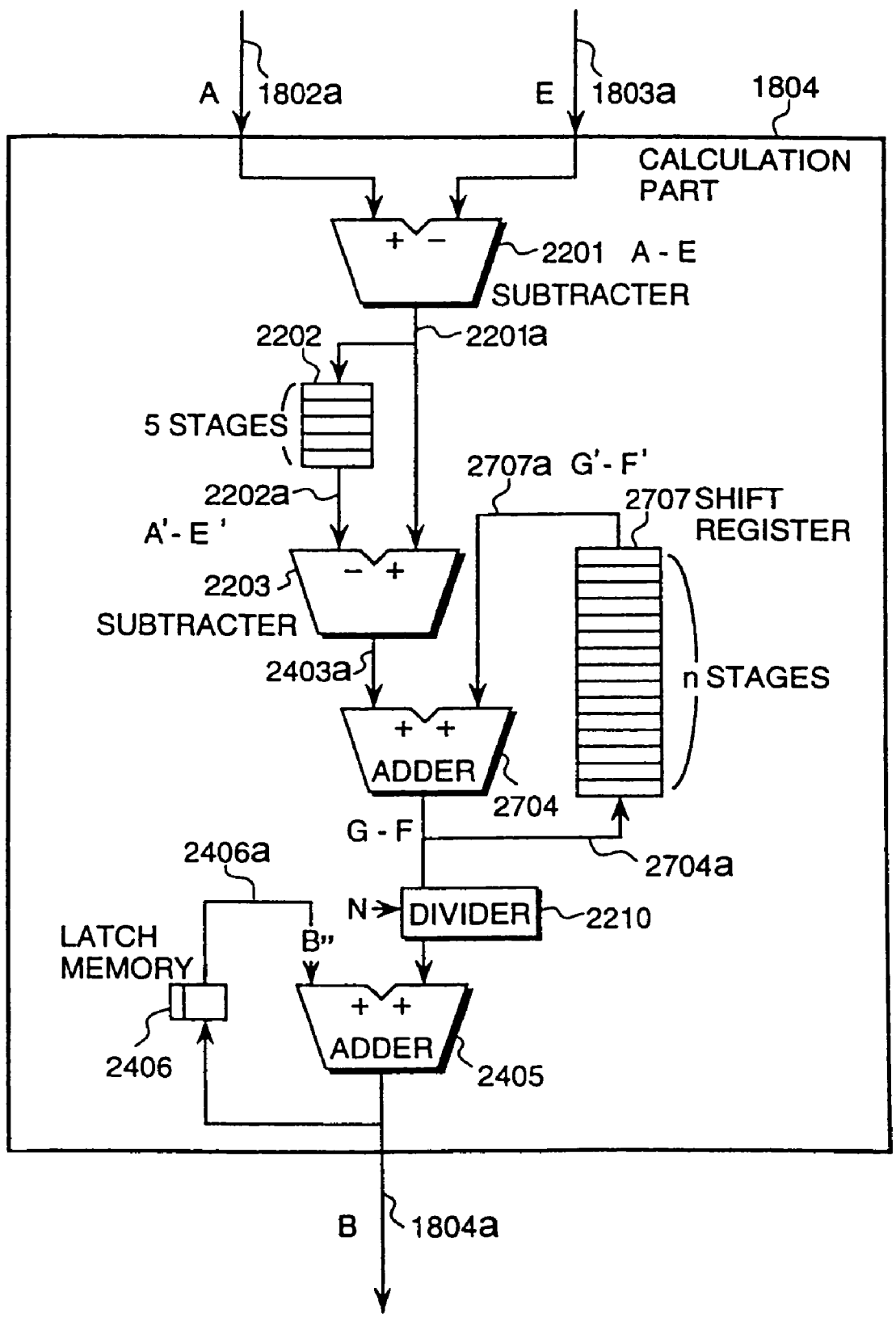
FIG. 27 is a circuit block diagram of another calculation part of the moving-average filter according to the present invention.

FIG. 27 shows a schematic circuit diagram of a calculation part 1804 in which this algorithm for obtaining a moving-average value is implemented. A hardware composition of an image processing apparatus can be composed similarly to that of the apparatus shown in FIG. 18 other than the calculation part 1804. Operations of the apparatus for implementing this algorithm is similar to those of the apparatus shown in FIG. 18, and image data of the input image are also read out in the horizontal direction.

The calculation part 1804 includes the subtracter 2201 for calculating (A–E), the shift register 2202 for holding values (A–E) by the amount for the region width, the subtracter 2203 for calculating ((A–E)–(A'–E')), an adder 2704 for calculating (G–F), the adder 2405 for calculating B, the latch memory 2406 for holding B', a shift register 2707 for holding values (G–F) by the amount for one line, and the divider 2210.

Figure 26:
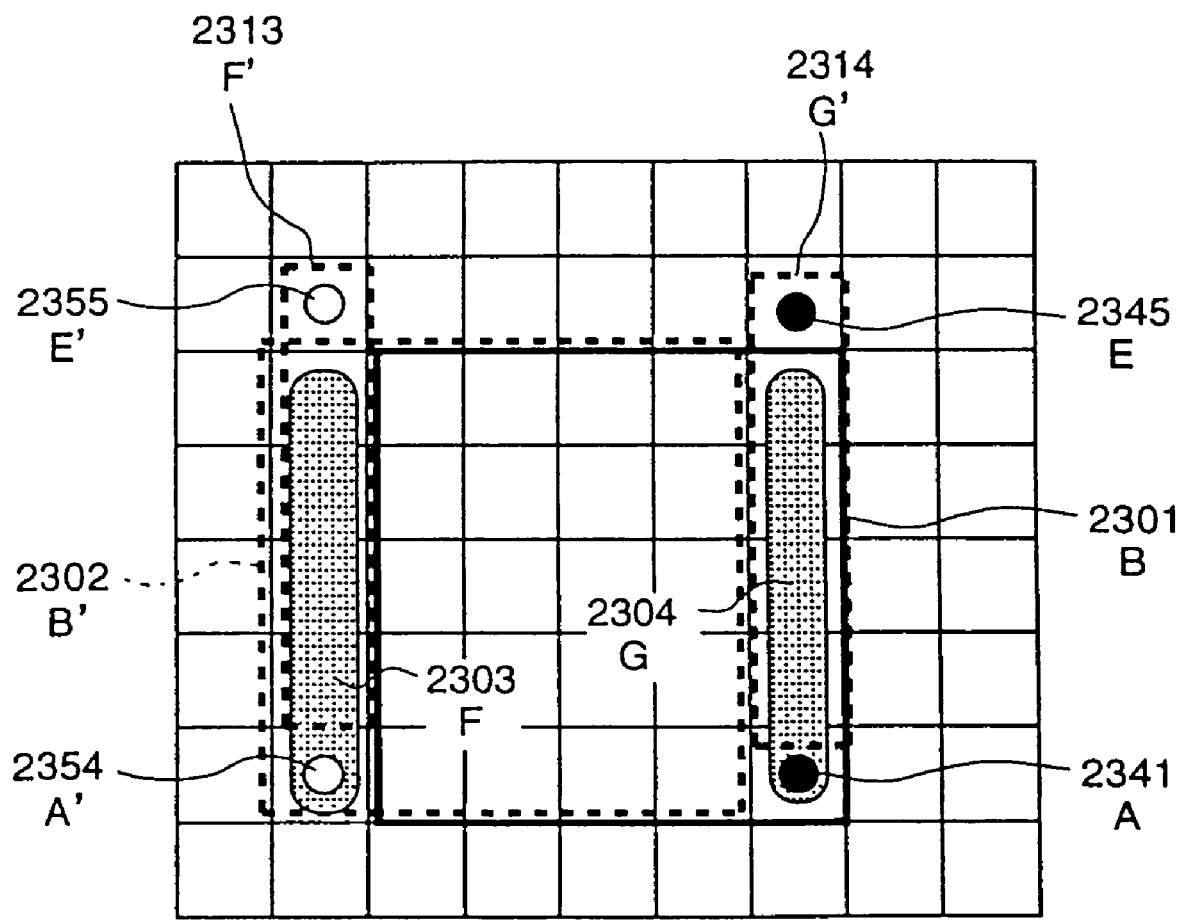
FIG. 26 is a diagram for conceptually explaining another algorithm used in the moving-average filter according to the present invention.

The calculation 1804 takes in the image data values A and E of the most right and lowest pixel and the most right and top pixel, which are shown in FIG. 26, and obtains the moving-average value B of the region 2301. The subtracter 2201 for calculating (A–E) receives the image data value A of the pixel 2341 via the transmission line 1802a and the image data value E of the pixel 2345 via the transmission line 1803a, further performs subtraction of (A–E), and outputs the result of the subtraction to the transmission line 2201a. The shift register 2202 receives an output signal (A–E) from the subtracter 2201 for calculating (A–E) via the transmission line 2201*a*, and holds values (A–E) by the amount for the region width. Therefore, an output signal from the shift register 2202 is a value (A–E) obtained previously by the region width, that is, the value (A'–E') shown in FIG. 26. The subtracter 2203 for calculating ((A–E)–(A'–E')) calculates ((A–E)–(A'–E')) by using an output signal from the subtracter 2201 for calculating (A–E) and an output signal from the shift register 2202, and output the results of the calculation to a transmission line 2203*a*. The adder 2704 for calculating (G–F) calculates (G–F) by using an output signal from the subtracter 2203 for calculating ((A–E)–(A'–E')) and an output signal (G'–F') from the shift register 2707, and outputs the result of the calculation to a transmission line 2704*a*. The shift register 2707 receives an output signal from the adder 2704 for calculating (G–F), and holds values (G–F) by the amount for one line in turn. Therefore, an output signal from the shift register 2707 is a value (G–F) obtained previously by one line, that is, the value (G'–F') shown in FIG. 26. The divider 2210 receives an output signal (G–F) from the adder 2704 for calculating (G–F), further divides (G–F) by the preset number N of pixels in the kernel region, and outputs the result of the division. The adder 2405 for calculating B receives an output signal B' from the latch memory 2406 for holding a value B' and an output signal from the divider 2210, further obtains the moving-average value B of the present kernel region, and outputs the obtained moving-average value via the transmission line 1804*a*. The latch memory 2406 for holding B' receives an output signal from the adder 2405 for calculating B via the transmission line 1804*a*, further delays the received output signal by one pixel, and outputs it as B' via a transmission line 2406*a*.

According to the above-mentioned operations, the algorithm expressed by equations 10 and 11 is implemented.

In accordance with this embodiment also, since access to the image memory can be continuously performed in the horizontal direction, moving-average values can be obtained at a high speed.

Figure 28:
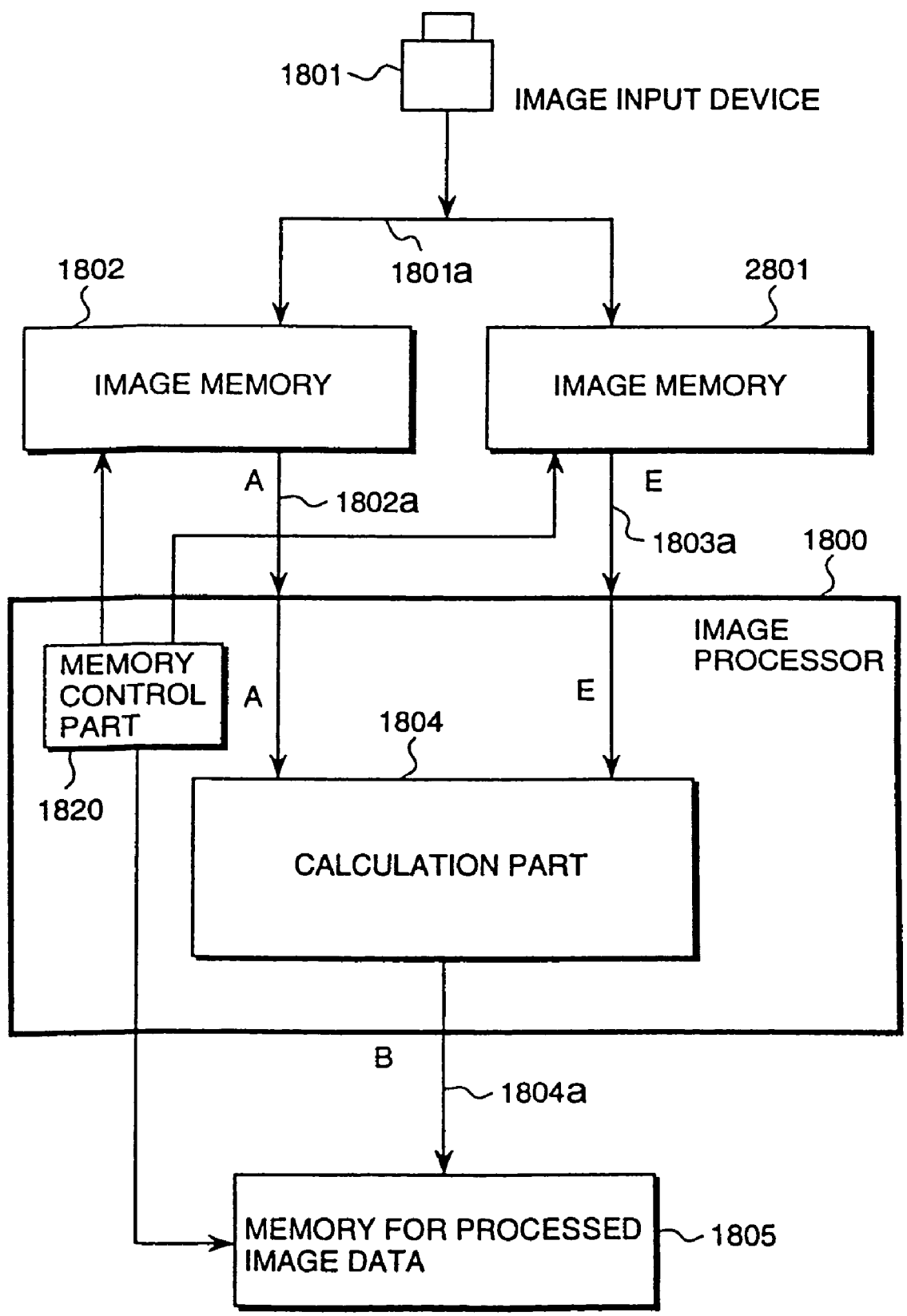
FIG. 28 is a block diagram of a moving-average filter of another embodiment according to the present invention.

In the following, another embodiment will be explained. FIG. 28 shows a schematic circuit diagram of an image processing apparatus of this embodiment. This apparatus includes the image input device 1801 for inputting an image, the image memory 1802 and an image memory 2801 which store image data of an image input by the image input device 1801, the image processor 1800 for processing an image, and the memory 1805 for storing image data of the image processed by the image processor 1800. Moreover, the image processor 1800 includes a calculation part 1804 for implementing one of the above-mentioned three algorithms shown FIGS. 21, 23 and 26, and a memory control part 1810 for controlling access to the image memories 1802 and 2801.

In FIG. 28, the memory control part 1820 designates an address to the memory 1802 and the memory 2801 for each pixel, and an image data of the pixel, which is output from the image input device 1801 via a transmission line 1801*a*, is stored at the designated address of the memory 1802 and the memory 2801. Furthermore, the memory control part 1820 transmits an instruction for reading image data to be processed, together with addresses of the image data, and image data read from the respective addresses of the memory 1802 and the memory 2801 are output to the calculation part 1804 via the transmission line 1802*a* and a transmission line 1803*a*. The calculation part 1804 receives the image data, which are output from the image memories 1802 and 2801, and implements one of the above-mentioned algorithms shown in FIGS. 21, 23 and 26. The result of the implementation is stored in the memory 1805 via a transmission line 1804*a*. Thus, the calculation part 1804 in this embodiment can implement the algorithms shown in FIGS. 21, 23 and 26, and the compositions shown in FIGS. 22, 24, 25 and 27 are applicable to the calculation part 1804.

In the following, operations of the image processing apparatus shown in FIG. 28 will be explained. Each of image data of the image taken in by the image input device 1801 is stored at an address of each of the image memories 1802 and 2801 via the transmission line 1801*a*, which is designated by the memory control part 1820. The designated addresses are equal to each other. This is, the same image data is written at the same address in the respective memories 1802 and 2801. The image processor 1800 reads out an image data A of the pixel 2341 of the present kernel region, stored in the image memory 1802, via the transmission line 1802*a*, and an image data E of the pixel 2345, stored in the image memory 2801, via the transmission line 1803*a*. The memory control part 1820 control image data reading so that an image data of the most right and lowest pixel 2341 is read out of the image memory 1802, and an image data of the most right and top pixel 2345 is read out of the image memory 2801. The calculation part 1804 takes in the image data value A of the pixel 2341 from the memory 1802 and the image data value E of the pixel 2345 from the memory 2801, further calculates the moving-average value B, and outputs the result of the calculation. The calculated moving-average value B is input to the memory 1805 via the transmission line 1804*a*, and is stored at an address of the image memory 1805, which is designated by the memory control part 1820. Similarly, in order to obtain a moving-average value of the next kernel region (the kernel region corresponding to the central pixel shifted by one pixel in the right direction from the central pixel of the present kernel region), the memory control part 1820 control image data reading so that an image data of a pixel which is shifted by one pixel in the right direction from the pixel 2341 is read out of the image memory 1802, and at the same time, an image data of a pixel which is shifted by one pixel in the right direction from the most right and top pixel 2345 is read out of the image memory 2801, and so forth. Similarly, in another line, a necessary image data of each pixel is read out in turn in the horizontal direction from each of the memories 1802 and 2801.

In this embodiment, since an image data of each pixel is stored at the same address in the image memory 1802 and the image memory 2801, two image memories are necessary. However, since an image data A of the pixel 2341 and an image data E of the pixel 2345, can be simultaneously read out, an image processing time in this embodiment is faster than that in the embodiment shown in FIG. 18, by the time necessary to transfer image data of one line to the line memory 1803. That is, by executing image processing as continuously reading an image data of each of the pixels 2341 in parallel, it is possible to perform access to the image memories, which is necessary to process an image, at a high speed, and to improve the performance of image processing. Furthermore, since the composition of the image memory 1802 is the same as that of the image memory 2801, the memory control part 1820 can control data reading so that an image data E of the pixel 2345 is read out of the image memory 2801, and pixel 2341 is read out of the image memory 1802.

Figure 29:
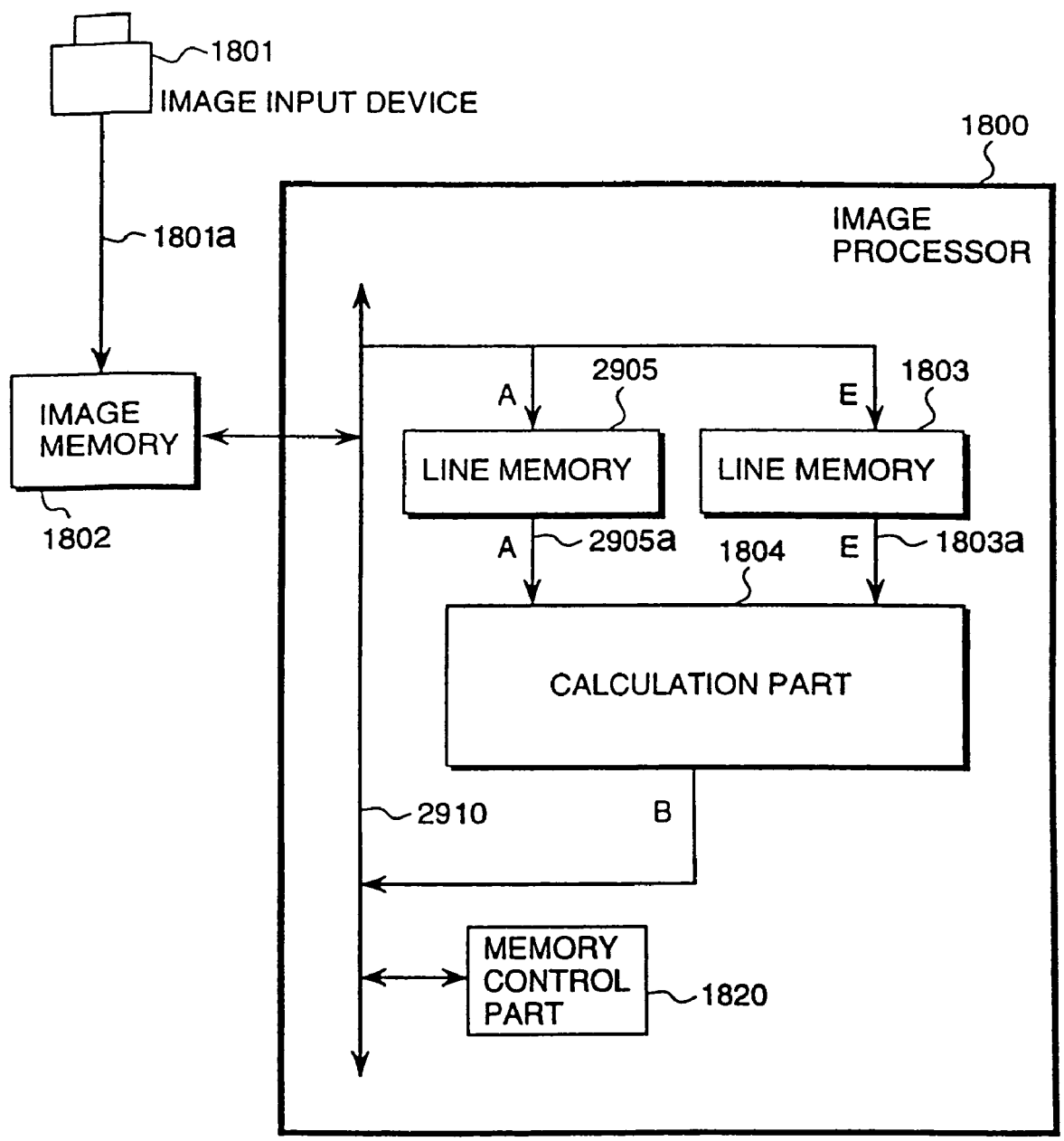
FIG. 29 is a block diagram of a moving-average filter of another embodiment according to the present invention.

In the following, another embodiment will be explained. FIG. 29 shows a schematic circuit diagram of an image processing apparatus of this embodiment. This apparatus includes the image input device 1801 for inputting an image, the image memory 1802 for storing image data of an image input by the image input device 1801, and the image processor 1800 for processing an image. Moreover, the image processor 1800 includes a line memory 2905 and the line memory 1803, each of which stores image data by the amount for one line, a memory control part 1820 for controlling access to the line memories 2905 and 1803, a calculation part 1804 for implementing one of the above-mentioned three algorithms shown FIGS. 21, 23 and 26, and a memory bus 2910 for connecting the above-mentioned memories and parts to each other.

In FIG. 29, the memory control part 1820 designates an address for each pixel to the memory 1802, and an image data of the pixel, which is output from the image input device 1801 via a transmission line 1801a, is stored at the designated address of the memory 1802. Furthermore, the memory control part 1820 transmits an instruction for reading each image data to be processed, together with an address of the image data, and image data read from the image memory 1802 are output to the line memory 2905 and the line memory 1803 via the memory bus 2910. The line memory 2905 and the line memory 1803 receiving image data output image data to the calculation part 1804 via a transmission line 2905a and the transmission line 1803a. The calculation part 1804 receives image data, further outputs from the line memories 2905 and 1803, and implements one of the above-mentioned algorithms shown in FIGS. 21, 23 and 26. The result of the implementation is stored in the memory 1802 via the memory bus 2910. Thus, the calculation part 1804 in this embodiment can implement the algorithms shown in FIGS. 21, 23 and 26, and the compositions shown in FIGS. 22, 24, 25 and 27 are applicable to the calculation part 1804.

In the following, operations of the image processing apparatus shown in FIG. 29 will be explained. Each of image data taken in by the image input device 1801 is stored at an address of the image memories 1802 via the transmission line 1801a, which is designated by the memory control part 1820. The image processor 1800 reads out image data by the amount for one line including the pixel 2341, which are stored in the image memory 1802, via the memory bus 2910, and stores the read image data in the line memory 2905. Moreover, the image processor 1800 reads out image data by the amount for one line including the pixel, which are stored in the image memory 2802, via the memory bus 2910, and stores the read image data in the line memory 1803. The memory control part 1820 designates an address of an image data of the most right and lowest pixel 2341 to the image memory 1802, and designates an address of an image data of the pixel 2345 to the image memory 1802. Writing of image data in the line memory 2905 and the line memory 1803 is performed at different timing, respectively. Furthermore, the memory control part 1820 controls data reading so that an image data of the pixel 2341 is read out of the line memory 2905, and at the same time, an image data of the pixel 2345 is read out of the line memory 1803. The calculation part 1804 takes in the image data value A of the pixel 2341 and the image data value E of the pixel 2345, and calculates the moving-average value B, and outputs the result of the calculation. The calculated moving-average value B is input to the memory 1802 via the memory bus 2910, and stored at an address of the image memory 1802, which is designated by the memory control part 1820. Similarly, in order to obtain a moving-average value of the next kernel region (the kernel region corresponding to the central pixel shifted by one pixel in the right direction from the central pixel of the present kernel region), the memory control part 1820 control image data reading so that an image data of a pixel which is shifted by one pixel in the right direction from the pixel 2341 is read out of the line memory 2905, and at the same time, an image data of a pixel which is shifted by one pixel in the right direction from the pixel 2345 is read out of the line memory 1803. If a central pixel of a kernel region transfers to the lower next line, image data of pixels by the amount for one line in the next line under the present pixel 2341 and image data of pixels for one line in the next line under the present pixel 2345 are read and stored in the line memories 2905 and 1803, respectively, and an image data of each pixel is also read out in turn in the horizontal direction.

In this embodiment, since a line memory 1803 for storing image data by the amount for one line including the pixel 2345 and a line memory 2905 for storing image data by the amount for one line including the pixel 2341 of the kernel region are provided, the time for storing image data in the line memories is longer, for example, in comparison with the embodiment shown in FIG. 28. However, it is possible to compose an image processing apparatus using only one image memory 1802. Thus, by executing image processing as continuously reading an image data of each pixel at the position corresponding to the pixel 2341 and an image data of each pixel at the position corresponding to the pixel 2341 in parallel, it is possible to perform access to the image memories, which is necessary to process an image, at a high speed, and to improve the performance of image processing. Furthermore, since the composition of the line memory 2905 is the same as that of the image memory 1803, the memory control part 1820 can control data writing so that image data by the amount for one line including the pixel 2341 are stored in the line memory 1803, and image data for one line including the pixel 2345 are stored in the image memory 2905.

Figure 30:
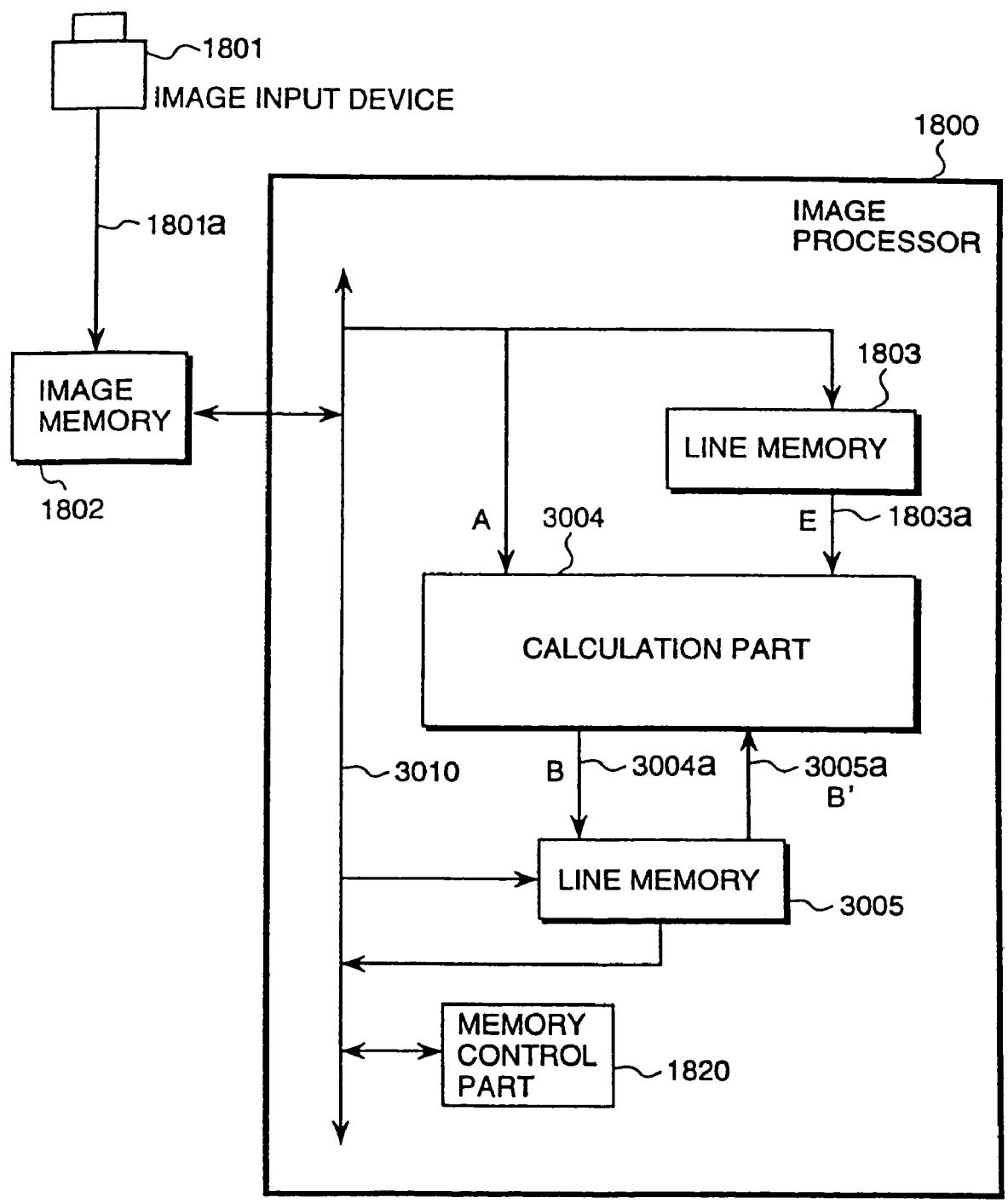
FIG. 30 is a block diagram of a moving-average filter of another embodiment according to the present invention.

In the following, another embodiment will be explained. FIG. 30 shows a schematic circuit diagram of an image processing apparatus of this embodiment. This apparatus includes the image input device 1801 for inputting an image, the image memory 1802 for storing image data of an image input by the image input device 1801, and the image processor 1800 for processing an image. Moreover, the image processor 1800 includes the line memory 1803 which stores image data by the amount for one line, a memory control part 1820 for controlling access to each of memories, a calculation part 3004 for implementing one of the above-mentioned three algorithms shown FIGS. 21, 23 and 26, a line memory 3005 for storing moving-average values B by the amount the amount for one line, and a memory bus 3010 for connecting the above-mentioned memories and parts to each other.

In FIG. 30, the memory control part 1820 designates an address for each pixel to the memory 1802, and an image data of the pixel, which is output from the image input device 1801 via a transmission line 1801a, is stored at the designated address of the memory 1802. Furthermore, the memory control part 1820 transmits an instruction for reading each image data to be processed, together with an address of the image data, and each image data read from the image memory 1802 is output to the line memory 1803 via the memory bus 3010. The line memory 1803 receiving image data outputs image data to the calculation part 3004 via the transmission line 1803a. The calculation part 3004 receives image data of pixels, which are output from the image memory 1802 and the line memory 1803, and implements one of the above-mentioned algorithms shown in FIGS. 21, 23 and 26. The result of the implementation is stored in the line memory 3005.

In the following, operations of the image processing apparatus shown in FIG. 30 will be explained. Each of image data of the image taken in by the image input device 1801 is stored at an address of the image memories 1802 via the transmission line 1801a, which is designated by the memory control part 1820. The image processor 1800 reads out image data by the amount for one line including the pixel 2141, which are stored in the image memory 1802, via the memory bus 3010, and stores the read image data in the line memory 1803. The memory control part 1820 designates an address of an image data of the pixel 2141 to the image memory 1802, and designates an address of an image data of the pixel 2145 to the line memory 1803. The calculation part 3004 takes in the image data value A of the pixel 2145 and the image data value E of the pixel 2345, further calculates the moving-average value B, and outputs the result of the calculation. The calculated moving-average value B is input to the line memory 3005 via a transmission line 3004a, and stored at an address of the line memory 3005, which is designated by the memory control part 1820. Similarly, in order to obtain a moving-average value of the next kernel region (the kernel region corresponding to the central pixel shifted by one pixel in the right direction from the central pixel of the present kernel region), the memory control part 1820 control image data reading so that an image data of a pixel which is shifted by one pixel in the right direction from the pixel 2141 is read out of the image memory 1802, and at the same time, an image data of a pixel which is shifted by one pixel in the right direction from the pixel 2145 is read out of the line memory 1803. If a central pixel of a kernel region transfers to the lower next line, image data of pixels for one line in the next line under the present pixel 2145 are read and stored in the line memory 1803, and an image data of each pixel is read out in turn. After moving-average processing of pixels for one line is completed, results stored in the line memory 3005 are continuously read out, and written in the image memory 1802 via the memory bus 3010.

Figure 31:
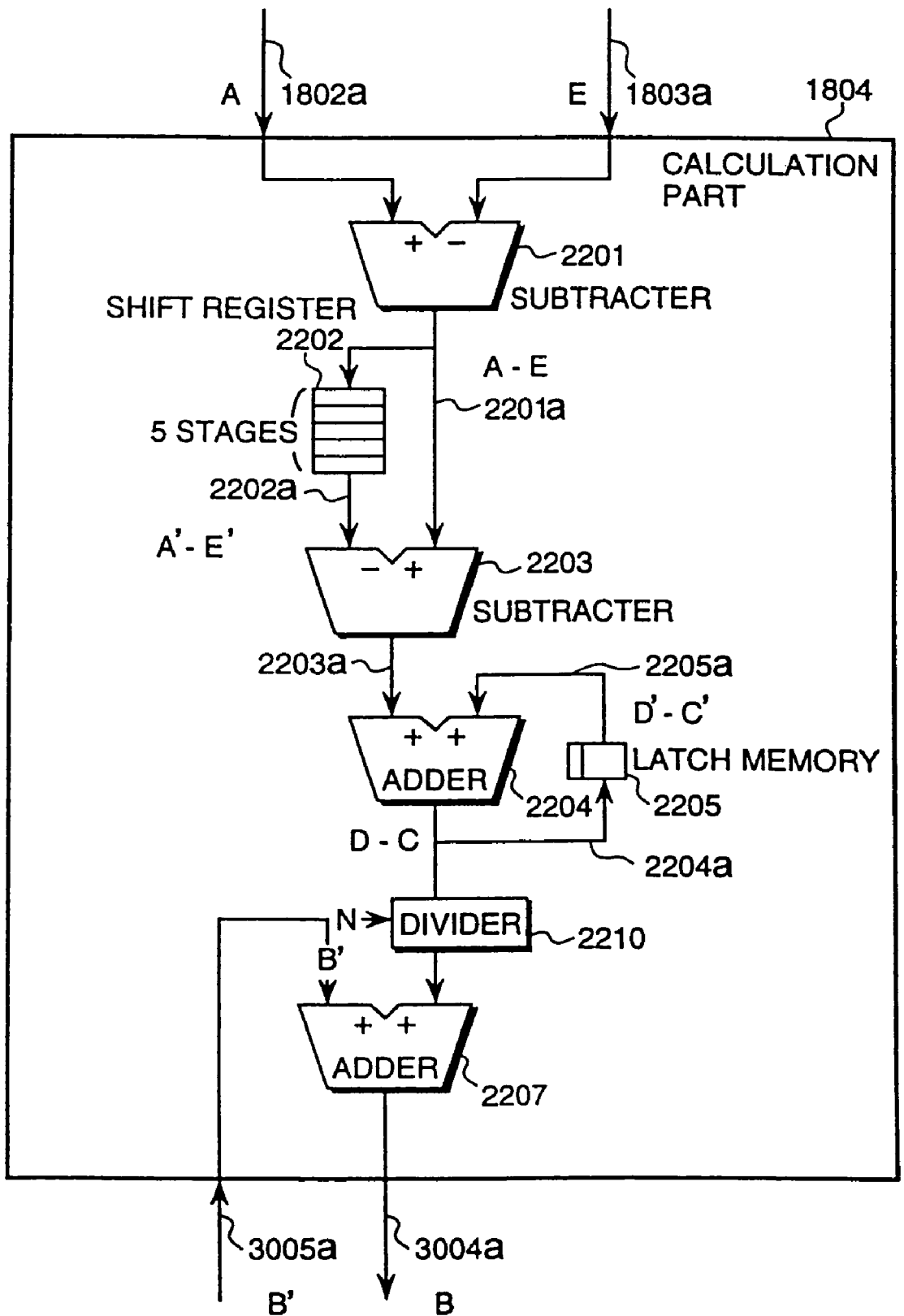
FIG. 31 is a circuit block diagram of another calculation part of the moving-average filter according to the present invention.

FIG. 31 shows a schematic circuit diagram of the calculation part 1804 used for this embodiment. The calculation part 1804 shown in FIG. 31 is composed by removing the shift register 2206 from the calculation part 1804 shown in FIG. 22 and transferring the function of the shift register 2206 to the newly added line memory 3005 for inputting and outputting calculation results of the calculation part 1804, which are stored in the line memory 3005, as shown in FIG. 30. This calculation part 1804 includes the subtracter 2201 for calculating (A−E), the shift register 2202 having the capacity for the width of the kernel region 2101 (image data of five pixels in the example shown in FIG. 21), the subtracter 2203 for calculating ((A−E)−(A'−E')), the adder 2204 for calculating (D−C), the latch memory for holding (D'−C'), the adder 2207 for calculating B, and the divider 2207.

The calculation part 1804 obtains the moving-average value B of the region 2301 by taking in the image data values A and E, for the pixel 2141 and the pixel 2145. The subtracter 2201 for calculating (A−E) takes in the image data value A via the transmission line 1802a, and the image data value E via the transmission line 1803a, further executes subtraction of (A−E), and outputs the result of the subtraction to a transmission line 2201a. The shift register 2202 receives each output signal from the subtracter 2201, and holds the output signals by the amount for the region width (five signals in the example shown in FIG. 21). Consequently, an output signal from the shift register 2202 is equal to a value (A−E) shifted by 5 pixels in the left direction, that is, (A'−E'). The subtracter 2203 for calculating ((A−E)−(A'−E')) calculates ((A−E)−(A'−E')) by receiving an output signal from the subtracter 2201 and an output signal from the shift register 2202, and outputs the results of the subtraction to a transmission line 2203a. The adder 2204 for calculating (D−C) adds five output signals of ((A−E)−(A'−E')) from the subtracter 2203, further calculates (D−C) by using the result of the addition and a value (D'−C') output from the latch memory 2205, and outputs the result of the calculation to a transmission line 2204a. The latch memory 2205 for holding (D−C) output from the adder 2204 delays the held (D−C) by one step corresponding to processing of an moving average for one central pixel, and outputs it as (D'−C') to the transmission line 2205a. The divider 2210 receives (D−C) output from the adder 2204, further divides the (D−C) by the number N of pixels in the kernel region, and outputs the result of the division to the adder 2207. The line memory 3005 receives an output signal from the adder 2207 for calculating B in turn, and holds the output signals by the amount for one line on the image (n words are held for the image shown in FIG. 19). Therefore, an output signal from the line memory 3005 is a value B obtained previously by one line, that is, a moving-average value B' of the kernel region 2102 shown in FIG. 21. The adder 2207 for calculating B receives an output signal from the line memory 3005 and an output signal from the divider 2210, further calculates a moving-average value B of the present kernel region, and outputs the result of the calculation to the transmission line 1804a.

In accordance with the above-mentioned procedures, the algorithm based on equations 6 and 7 is implemented.

As mentioned above, by providing the line memory 1803 and the line memory 3005, since it is possible to execute successively calculating of each moving-average value as continuously reading out an image data value A corresponding to the pixel 2141 and an image data value E corresponding to the pixel 2145 in, in the horizontal direction, memory access required to obtain a moving-average value can be more quickly than in conventional methods, and the performance of image processing can be improved. In this embodiment, image data of pixels in a line pixels including the pixel 2145 are stored in the line memory 1803. However, it is also possible to store image data of pixels in a line of pixels including the pixel 2141 are stored in the line memory 1803.

Furthermore, the above-mentioned function to process an image, which is performed by the calculation part 1804, can be also realized by a software.

Figure 32:
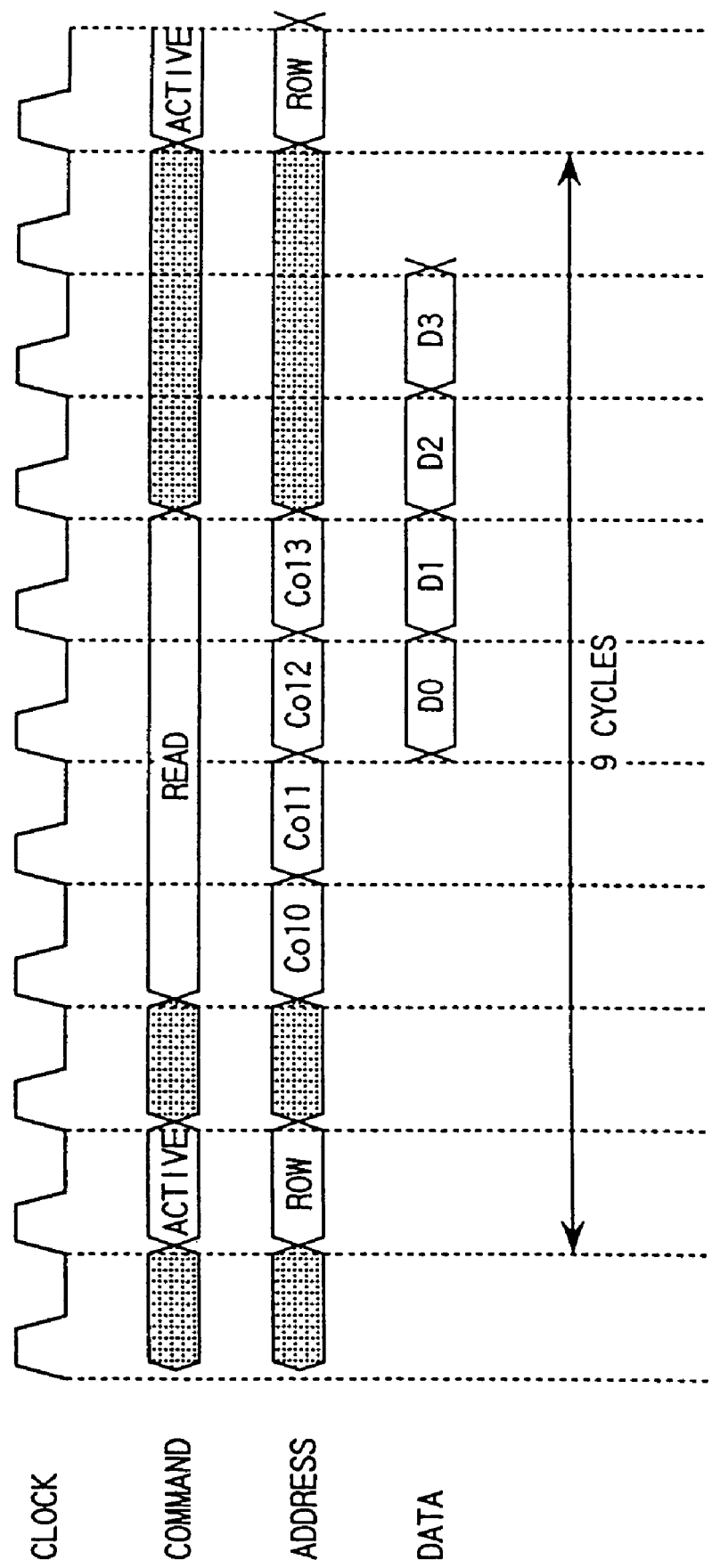
FIG. 32 is a time chart for explaining operations of the moving-average filter according to the present invention.
Figure 33:
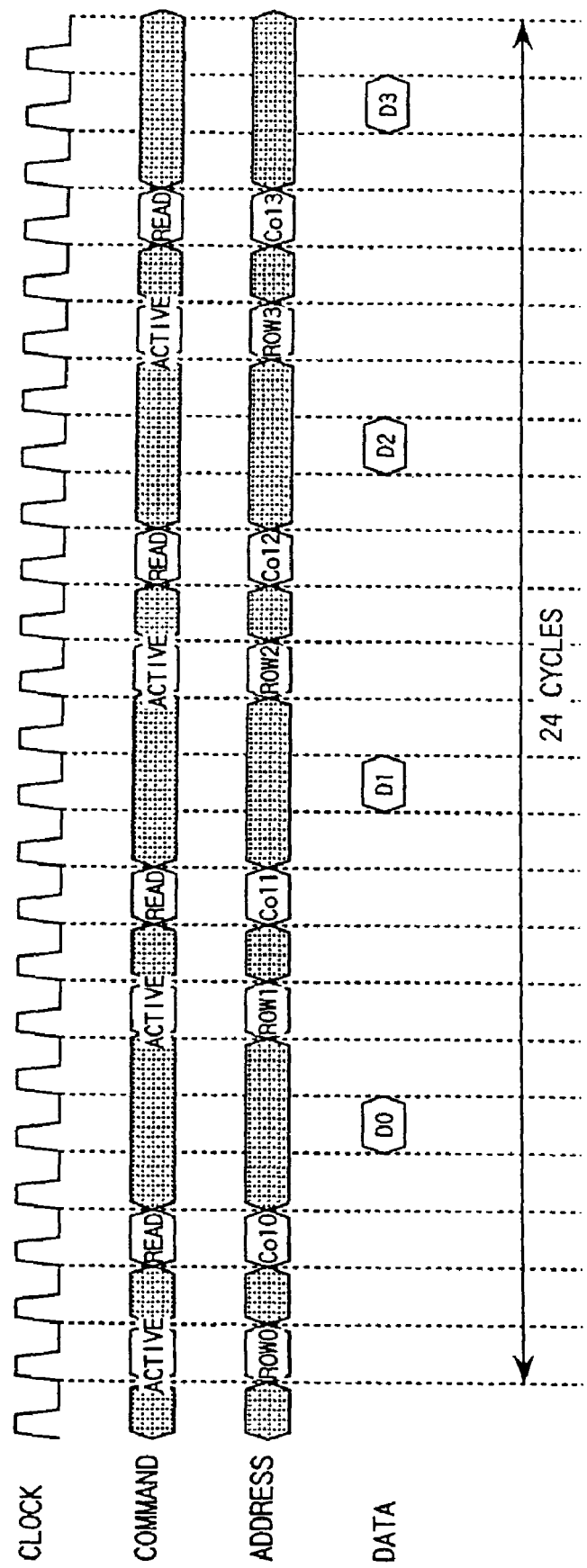
FIG. 33 is a time chart for explaining operations of a conventional moving-average filter.

The above later six embodiments which are, for example, shown in FIG. 21, FIG. 23, FIG. 26, FIG. 28, FIG. 29 and FIG. 30, respectively, have the following effects. FIG. 32 shows a time chart of operations in the above embodiments according to the present invention, and FIG. 33 shows a time chart of operations in a conventional method. In the embodiments shown in FIG. 32 and the method shown in FIG. 33, general SDRAMs are used. Each of the time charts shows time sequences of commands and addresses, which are to be processed, and corresponding data to be read out or written in a memory. In the conventional method, since data of discontinuous addresses are read out or written in a memory, a row address and a column address of the item of data should be designated, whenever access to each item of data is performed. Therefore, it takes 24 cycles to read out image data of four pixels (D1–D4), as shown in FIG. 33. On the other hand, in accordance with the above embodiments, each block of data in the column direction can be continuously read out with a burst read mode by designating successive column addresses after designating a row address. Consequently, it is possible to read out image data of four pixels (D1–D4) in 9 cycles. Thus, the above embodiments can read out data more quickly than the conventional method. That is, in accordance with the above embodiment according to the present invention, it is possible to perform moving-average filtering of image at a high speed.

In the following, an electron microscope using the above-mentioned image processing apparatus according to the present invention will be explained.

Figure 34:
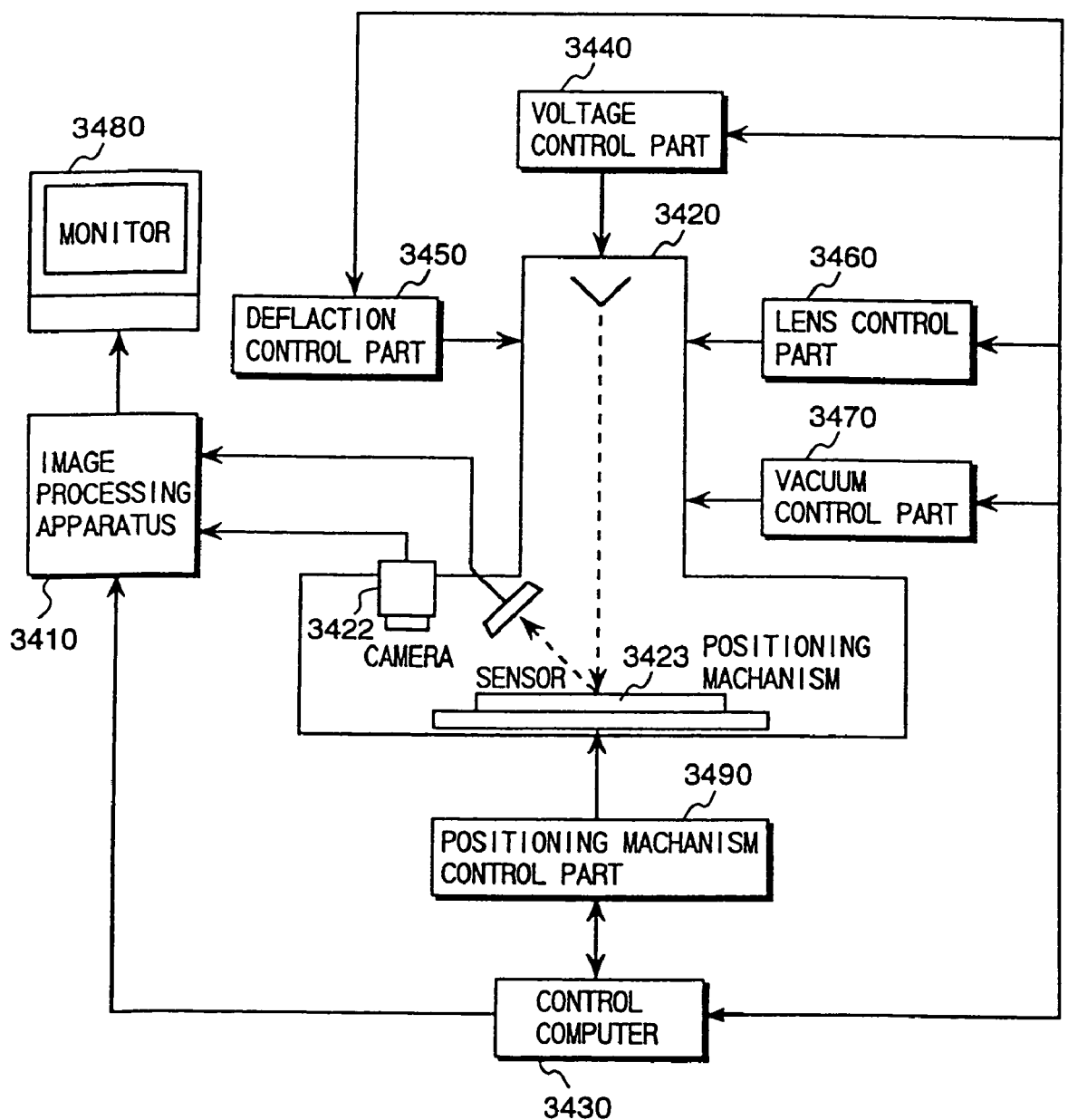
FIG. 34 is a schematic block diagram of an electron microscope system to which the moving-average filter according to the present invention is applied.
Figure 36:
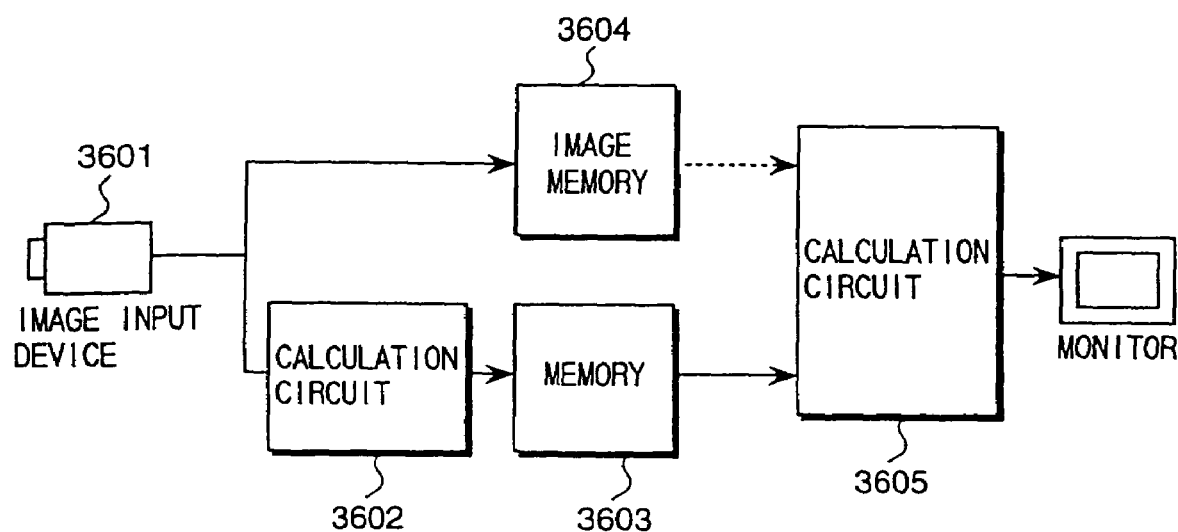
FIG. 36 is a block diagram of a conventional moving-average filter.
Figure 37:
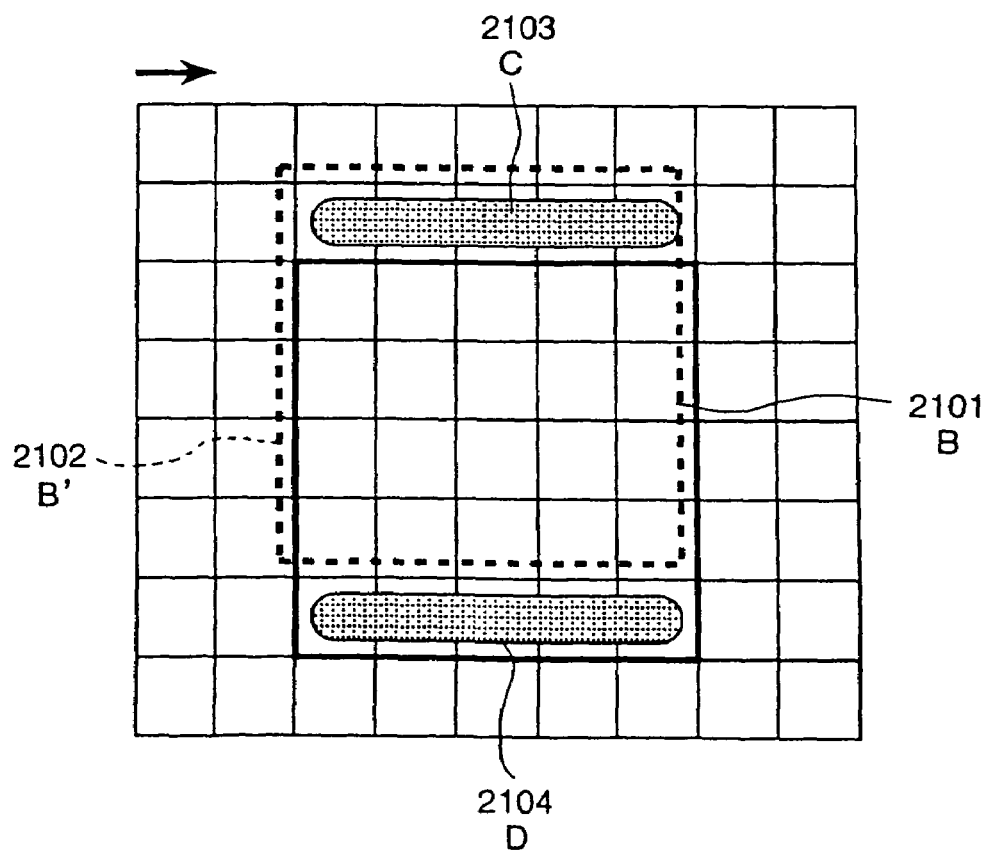
FIG. 37 is a diagram for conceptually explaining an algorithm used in a conventional moving-average filter.

An electron microscope system shown in FIG. 34 is composed of the above-mentioned image processing apparatus 3410, an electron microscope 3420, a control computer 3430 for controlling the electron microscope 3420, a voltage control part for controlling voltage to adjust an electron beam generated in the electron microscope 3420, a deflection control part 3450 for shaping the electron beam, a lens control part 3460 for controlling a lens to focus on an object to be measured by the electron microscope 3420, a vacuum control part 3470 for keeping the vacuum in the electron microscope 3420, a monitor 3480 for displaying the result of measurement, a sensor 3421 for sensing secondary electrons reflected from the object, a positioning mechanism 3423 for moving the object, and a positioning mechanism control part 3490.

The electron microscope system irradiate an object to be measured with an electron beam controlled by the voltage control part 3440. The sensor 3421 senses secondary electrons reflected from the object, and an image formed by the reflected secondary electrons, which is sensed by the sensor 3421, is processed by the image processing apparatus 3410. The image processing apparatus 3410 performs gradation processing, edge enhancement processing, the above-explained moving-average filtering according to the present invention, etc. By using the image processing apparatus according to the present invention, processing of the measured image can be performed at a high speed.

As an example of application of an image processing apparatus according to the present invention, the electron microscope system shown in FIG. 34 has been explained. However, an image processing apparatus according to the present invention can be applied to any system performing image processing.

In accordance with the present invention, a moving-average value of an image data of each pixel in an image can be obtained by performing the continuous access to successive addresses. Thus, in an image processing apparatus using DRAMs or SDRAMs, since highly efficient memory access can be realized, it becomes to process an image at a high speed.

What is claimed is:

1. An apparatus for calculating a normalized correlation coefficient used as a similarity evaluation measure by using image data values of pixels in a template image and image data values of pixels in a subimage, included in a search image, corresponding to the template image, comprising:

a memory for storing image data values of pixels in the search image;

sum calculating means for calculating a sum of image data values of pixels in a first rectangular region, defined by a plurality of rows and columns, in the search image by using a sum, obtained prior to the sum of image data values of pixels in the first rectangular region, of image data values of pixels in a second rectangular region having a partial region in common with the first rectangular region, and using a difference between image data values of pixels in a region, included in the first rectangular region, other than the partial region and image data values of pixels in a region, included in the second rectangular region, other than the partial region, the difference being calculated by using a first image data value of a pixel which is adjacent to the uppermost pixel in a first column of the first rectangular region positioned on one side thereof on the upper side of the uppermost pixel, a second image data value of the lowermost pixel in the first column, a third image data value of a pixel which is adjacent to the uppermost pixel in a column, positioned on the opposite side to the first column, of the second rectangular region on the upper side of the uppermost pixel, the third image data value having been read out prior to the sum of image data values of pixels in the first rectangular region, and a fourth image data value of the lowermost pixel in the second column of the second rectangular region; and normalized correlation coefficient calculating means for calculating a normalized correlation coefficient on the basis of a sum of image data values of pixels in the template image and a sum of image data values of pixels in the first rectangular region in the search image.

2. An apparatus for calculating a normalized correlation coefficient according to claim 1 wherein said sum calculating means, at first, in order to obtain sums of image data values for (I–M+1) sub-images corresponding to respective starting points (i, 0)(i=0, 1, . . . , I–M, where I is the number of pixels in the search image in the row direction, and M is the number of pixels in the template image in the row direction):

calculates a sum of image data values for each area composed of pixels for one column and N rows, the number N being equal to that of rows in the template image, further each area corresponding to a starting point (i, 0)(I=0, 1, . . . , I–1);

accumulates M sums of image data values for M areas of pixels for 1 column and N rows, to obtain a sum of image data values for a sub-image corresponding to a starting point (0, 0) is obtained; and successively obtains sums of sub-images corresponding to starting points (1, 0), (2, 0), . . . , (I–M, 0) in turn, by adding a sum of image data values for an area of pixels for one column and N rows to a sum for a previous sub-area and subtracting a sum of image data values for another area of pixels for one column and N rows from the sum for the previous sub-area.

3. An apparatus for calculating a normalized correlation coefficient according to claim 2, wherein, in order to obtain sums of image data values for (I–M+1) sub-images corresponding to the respective starting points (i, 1)(i=0, 1, . . . , I–M, where I is the number of pixels in the search image in the row direction, and M is the number of pixels in the template image in the row direction) said sum calculating means:

calculates a sum of image data values for each area of pixels for one column and N rows, the number N being equal to that of rows in the template image for each area corresponding to a starting point (i, 1)(I=0, 1, . . . , I–1) by making use of the already obtained sums of image data values for areas corresponding to starting points (i, 0)(I=0, 1, . . . , I–1), and adding an image data value of pixels to a sum for a previous area and subtracting an image data value of another pixel from the previous area;

accumulates the M sums of image data values for M areas, each area being composed of pixels for one column and N rows, to obtain a sum of image data values for a sub-image corresponding to a starting point (0, 1);

successively obtains sums of sub-images corresponding to starting points (1, 1), (2, 1), . . . , (I–M, 1) in turn, by adding a sum of image data values for an area of pixels for one column and N rows to a sum for a previous sub-area and subtracting a sum of image data values for another area of pixels for one column and N rows from the sum for the previous sub-area; and obtains, for J=2, . . . , J–N, a sum of image data values for each sub-image by making use of previously calculated results for J=1, where J is the number of pixels in the search image in the column direction, and N is the number of pixels in the template image in the column direction.

4. An apparatus for calculating a normalized correlation coefficient according to claim 3 wherein said sum calculating means and said normalized correlation coefficient calculating means are implemented in a programmed general purpose digital computer.

5. An apparatus for calculating a normalized correlation coefficient according to claim 4 wherein said memory is an external memory and further including means to read the image data read out of said external memory, and store the data of the template and search images in an array of type t(m, n)(m=0, 1, 2; n=0, 1, 2) and s(i, j)(i=0, 1, . . . , 4; j=0, 1, . . . 4), respectively in an internal memory in said computer.

6. An apparatus for calculating a normalized correlation coefficient according to claim 1 wherein said sum calculating means and said normalized correlation coefficient calculating means are implemented in a programmed general purpose digital computer.

7. An apparatus for calculating a normalized correlation coefficient according to claim 6 wherein said memory is an external memory and further including means to read the image data read out of said external memory, and store the data of the template and search images in an array of type t(m, n)(m=0, 1, 2; n=0, 1, 2) and s(i, j)(i=0, 1, . . . , 4; j=0, 1, . . . 4), respectively in an internal memory in said computer.

8. An apparatus for calculating a normalized correlation coefficient used as a similarity evaluation measure by using image data values of pixels in a template image and image data values of pixels in a subimage, included in a search image, corresponding to the template image, comprising:

a memory for storing image data values of pixels in the search image;

a sum-of-squares calculating means for calculating a sum of squares of image data values of pixels in a first rectangular region, defined by a plurality of rows and columns, in the search image by using a sum, obtained prior to the sum of squares of image data values of pixels in the first rectangular region, of image data values of pixels in a second rectangular region having a partial region in common with the first rectangular region, and using a difference between image data values of pixels in a region, included in the first rectangular region, other than the partial region and image data values of pixels in a region, included in the second rectangular region, other than the partial region, the difference being calculated by using a first image data value of a pixel which is adjacent to the uppermost pixel in a first column of the first rectangular region positioned on one side thereof on the upper side of the uppermost pixel, a second image data value of the lowermost pixel in the first column, a third image data value of a pixel which is adjacent to the uppermost pixel in a column, positioned on the opposite side to the first column, of the second rectangular region on the upper side of the uppermost pixel, the third image data value having been read out prior to the sum of squares of image data values of pixels in the first rectangular region, and a fourth image data value of the lowermost pixel in the second column of the second rectangular region; and normalized correlation coefficient calculating means for calculating a normalized correlation coefficient on the basis of a sum of squares of image data values of pixels in the template image and a sum of squares of image data values of pixels in the first rectangular region in the search image.

9. An apparatus for calculating a normalized correlation coefficient according to claim 8 wherein said sum of squares calculating means, at first, in order to obtain sums of squares of image data values for (I–M+1) sub-images corresponding to respective starting points (i, 0)(i=0, 1, . . . , I–M, where I is the number of pixels in the search image in the row direction, and M is the number of pixels in the template image in the row direction):

calculates a sum of squares of image data values for each area composed of pixels for one column and N rows, the number N being equal to that of rows in the template image, further each area corresponding to a starting point (i, 0)(I=0, 1, . . . , I–1);

accumulates M sums of squares of image data values for M areas of pixels for 1 column and N rows, to obtain a sum of squares of image data values for a sub-image corresponding to a starting point (0, 0) is obtained; and successively obtains sums of squares of sub-images corresponding to starting points (1, 0), (2, 0), . . . , (I–M, 0) in turn, by adding image data values for an area of pixels for one column and N rows to a sum of squares for a previous sub-area and subtracting a sum of squares of image data values for another area of pixels for one column and N rows from the sum of squares for the previous sub-area.

10. An apparatus for calculating a normalized correlation coefficient according to claim 9, wherein, in order to obtain sums of squares of image data values for (I–M+1) sub-images corresponding to the respective starting points (i, 1)(i=0, 1, . . . , I–M, where I is the number of pixels in the search image in the row direction, and M is the number of pixels in the template image in the row direction) said sum of squares calculating means:

calculates a sum of squares of image data values for each area of pixels for one column and N rows, the number N being equal to that of rows in the template image for each area corresponding to a starting point (i, 1)(I=0, 1, . . . , I–1) by making use of the already obtained sums of squares of image data values for areas corresponding to starting points (i, 0)(I=0, 1, . . . , I–1), and adding an image data value of pixels to a sum of squares for a previous area and subtracting an image data value of another pixel from the previous area;

accumulates the M sums of squares of image data values for M areas, each area being composed of pixels for one column and N rows, to obtain a sum of squares of image data values for a sub-image corresponding to a starting point (0, 1);

successively obtains sums of squares of sub-images corresponding to starting points (1, 1), (2, 1), . . . , (I–M, 1) in turn, by adding a sum of squares of image data values for an area of pixels for one column and N rows to a sum of squares for a previous sub-area and subtracting a sum of squares of image data values for another area of pixels for one column and N rows from the sum of squares for the previous sub-area; and obtains, for J=2, . . . , J−N, a sum of squares of image data values for each sub-image by making use of previously calculated results for J=1, where J is the number of pixels in the search image in the column direction, and N is the number of pixels in the template image in the column direction.

11. An apparatus for calculating a normalized correlation coefficient according to claim 10 wherein said sum of squares calculating means and said normalized correlation coefficient calculating means are implemented in a programmed general purpose digital computer.

12. An apparatus for calculating a normalized correlation coefficient according to claim 11 wherein said memory is an external memory and further including means to read the image data read out of said external memory, and store the data of the template and search images in an array of type t(m, n)(m=0, 1, 2; n=0, 1, 2) and s(i, j)(i=0, 1, . . . , 4; j=0, 1, . . . 4), respectively in an internal memory in said computer.

13. An apparatus for calculating a normalized correlation coefficient according to claim 8 wherein said sum of squares calculating means and said normalized correlation coefficient calculating means are implemented in a programmed general purpose digital computer.

14. An apparatus for calculating a normalized correlation coefficient according to claim 13 wherein said memory is an external memory and further including means to read the image data read out of said external memory, and store the data of the template and search images in an array of type t(m, n)(m=0, 1, 2; n=0, 1, 2) and s(i, j)(i=0, 1, . . . , 4; j=0, 1, . . . 4), respectively in an internal memory in said computer.

* * * * *